(12) United States Patent
Li et al.

(10) Patent No.: US 12,273,298 B2
(45) Date of Patent: Apr. 8, 2025

(54) UPLINK PREEMPTION INDICATION FOR FULL-DUPLEX BASED IAB

(71) Applicant: QUALCOMM Incorporated, San Diego, CA (US)

(72) Inventors: Qiaoyu Li, Beijing (CN); Yu Zhang, Beijing (CN); Min Huang, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/628,009

(22) PCT Filed: Aug. 1, 2019

(86) PCT No.: PCT/CN2019/098797
§ 371 (c)(1),
(2) Date: Jan. 18, 2022

(87) PCT Pub. No.: WO2021/016977
PCT Pub. Date: Feb. 4, 2021

(65) Prior Publication Data
US 2022/0263635 A1 Aug. 18, 2022

(51) Int. Cl.
*H04L 5/00* (2006.01)
*H04W 28/26* (2009.01)

(52) U.S. Cl.
CPC .......... *H04L 5/0064* (2013.01); *H04L 5/0007* (2013.01); *H04L 5/0051* (2013.01); *H04W 28/26* (2013.01)

(58) Field of Classification Search
CPC ... H04L 5/0064; H04L 5/0007; H04L 5/0051; H04L 5/0053; H04L 5/0073;
(Continued)

(56) References Cited

U.S. PATENT DOCUMENTS

2019/0045546 A1 2/2019 Li
2020/0396730 A1* 12/2020 Kim ..................... H04W 72/21
(Continued)

FOREIGN PATENT DOCUMENTS

CN 109328481 A 2/2019
CN 109906576 A 6/2019
(Continued)

OTHER PUBLICATIONS

Supplementary European Search Report—EP19939750—Search Authority—The Hague—Jan. 31, 2023.
(Continued)

*Primary Examiner* — Sharmin Chowdhury
(74) *Attorney, Agent, or Firm* — QUALCOMM Incorporated

(57) ABSTRACT

Aspects of the present disclosure provide techniques for transmitting an uplink preemption indication in an integrated access and backhaul (IAB) system identifying the resources or symbols that may be punctured by the IAB in order to minimize self-interference at an IAB node when an ultra-reliable-low latency communications (URLLC) packet is received at the IAB node from one of a child IAB node or a user equipment (UE) during an on-going uplink transmission from an IAB node to a parent backhaul node.

34 Claims, 8 Drawing Sheets

(58) Field of Classification Search
CPC ... H04L 5/0091; H04L 5/0032; H04L 5/0044; H04L 5/001; H04L 5/0026; H04L 5/14; H04W 28/26; H04W 72/23; H04W 72/569

See application file for complete search history.

(56) References Cited

U.S. PATENT DOCUMENTS

| | | | | |
|---|---|---|---|---|
| 2021/0160901 | A1* | 5/2021 | Takeda | H04W 72/21 |
| 2021/0195623 | A1* | 6/2021 | Xu | H04W 72/569 |
| 2021/0298008 | A1* | 9/2021 | Yamamoto | H04L 1/0009 |
| 2022/0322472 | A1* | 10/2022 | Kusashima | H04W 76/15 |
| 2023/0353276 | A1* | 11/2023 | Park | H04L 1/1861 |

FOREIGN PATENT DOCUMENTS

| | | |
|---|---|---|
| WO | 2018031638 A1 | 2/2018 |
| WO | 2018085485 A1 | 5/2018 |
| WO | 2018129325 A1 | 7/2018 |
| WO | 2018142201 A1 | 8/2018 |
| WO | 2018144471 A1 | 8/2018 |
| WO | 2018204491 A1 | 11/2018 |

OTHER PUBLICATIONS

Convida Wireless: "Prioritization and Pre-emption of Transmissions for I-IoT", 3GPP TSG-RAN WG2 Meeting #106, R2-1907215, Reno, USA, May 13-17, 2019, May 2, 2019 (Feb. 5, 2019), 3 Pages, the whole document.
International Search Report and Written Opinion—PCT/CN2019/098797—ISAEPO—May 6, 2020.

* cited by examiner

UPLINK PREEMPTION INDICATION FOR FULL-DUPLEX BASED IAB

CROSS-REFERENCE TO RELATED APPLICATION

This application is a 35 U.S.C. § 371 National Phase Application of PCT Application No. PCT/CN2019/098797 filed Aug. 1, 2019, entitled "UPLINK PREEMPTION INDICATION FOR FULL-DUPLEX BASED IAB." The disclosure of this prior application is hereby incorporated by reference herein in its entirety.

BACKGROUND

The present disclosure relates to wireless communication systems, and more particularly, uplink preemption indication for full-duplex based integrated access and backhaul (IAB) node in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current backhaul solutions may not provide a desired level of speed or customization for efficient operation. Thus, improvements in wireless communication operations may be desired.

SUMMARY

Aspects of the present disclosure provide techniques for transmitting an uplink preemption indication in an integrated access and backhaul (IAB) system identifying the resources or symbols that may be punctured by the IAB in order to minimize self-interference at an IAB node when an ultra-reliable-low latency communications (URLLC) packet is received at the IAB node from one of a child IAB node or a user equipment (UE) during an on-going uplink transmission from an IAB node to a parent backhaul node.

In one example, a method for wireless communication is disclosed. The method may include transmitting an uplink traffic from a first node to a second node during a first time slot over a physical uplink shared channel (PUSCH). The method may further include receiving, at the first node, an urgent URLLC traffic from a third node during the first time slot on resources that collide with the uplink traffic transmission from the first node to the parent backhaul node. The method may further include puncturing at least a portion of a resource of the PUSCH for the uplink traffic from the first node to the second node during the first time slot based on reception of the urgent URLLC traffic at the first node. The method may further include transmitting an uplink preemption indication from the first node to the second node identifying at least the portion of the resource that is punctured by the first node.

In another example, an apparatus for wireless communications. The apparatus may include a memory having instructions and a processor configured to execute the instructions to transmit an uplink traffic from the first node to a second node during a first time slot over a PUSCH. The processor may be configured to execute the instructions to receive, at the first node, an URLLC traffic from a third node during the first time slot on resources that collide with the uplink traffic transmission from the first node to the second node. The processor may further be configured to execute the instructions to puncture at least a portion of a resource of the PUSCH for the uplink traffic from the first node to the second node during the first time slot based on reception of the urgent URLLC traffic at the first node. The processor may further be configured to execute the instructions to transmit an uplink preemption indication from the first node to the second node identifying at least the portion of the resource that is punctured by the first node.

In some aspects, a non-transitory computer readable medium includes instructions stored therein that, when executed by a processor, cause the processor to perform the steps of transmitting an uplink traffic from the first node to a second node during a first time slot over a PUSCH. The computer readable medium may further include instructions for receiving, at the first node, an urgent URLLC traffic from a third node during the first time slot on resources that collide with the uplink traffic transmission from the first node to the second node. The computer readable medium may further include instructions for puncturing at least a portion of a resource of the PUSCH for the uplink traffic from the first node to the second node during the first time slot based on reception of the urgent URLLC traffic at the first node. The computer readable medium may further include instructions for transmitting an uplink preemption indication from the first node to the parent backhaul node identifying at least the portion of the resource that is punctured by the first node.

In certain aspects, an apparatus includes means for transmitting an uplink traffic from the first node to a second node during a first time slot over a PUSCH. The apparatus may further include means for receiving, at the first node, an urgent URLLC traffic from a third node during the first time slot on resources that collide with the uplink traffic transmission from the first node to the second node. The apparatus may further include means for puncturing at least a portion of a resource of the PUSCH for the uplink traffic from the first to the second node during the first time slot based on reception of the urgent URLLC traffic at the first node. The apparatus may further include means for transmitting an uplink preemption indication from the first node to the second node identifying at least the portion of the resource that is punctured by the first node.

In some examples, another method, apparatus, and computer readable medium is disclosed. The method may include receiving an uplink traffic from a first node during a first time slot over a PUSCH. The method may further include receiving an uplink preemption indication at a second node from the first node identifying that at least a portion of a resource of the PUSCH for the uplink traffic from the first node to the second node was punctured by the first node due to an urgent URLLC traffic being received at the first node during the first time slot over at least the portion of the resources that collide with the uplink traffic transmission from the first node to the second node. The method may further include decoding the uplink preemption indication in order to identify at least the portion of the resource corresponding to a punctured traffic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
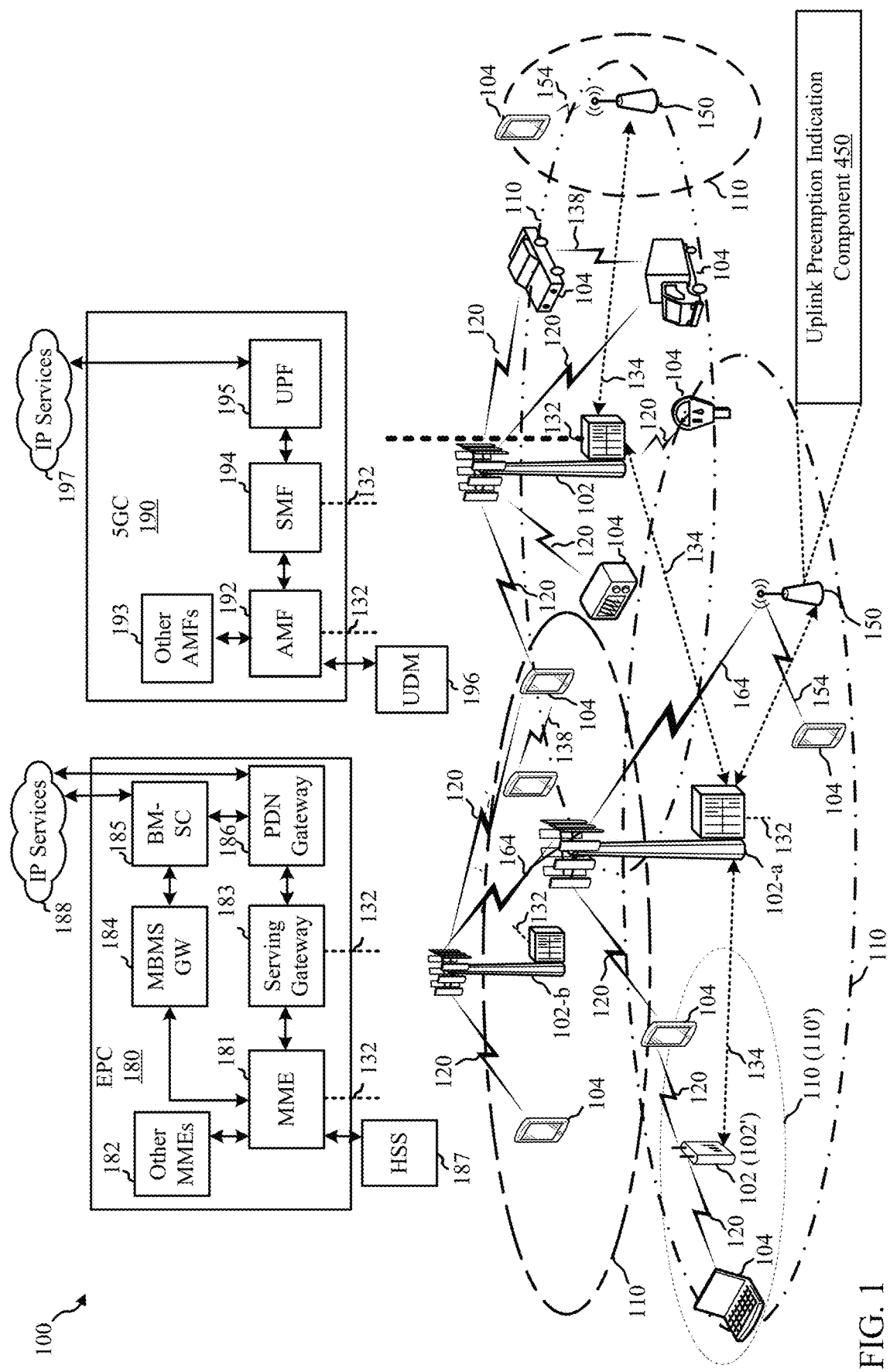
FIG. 1 is a schematic diagram of an example of a wireless communications system in accordance with aspects of the present disclosure.

One aspect of the 5G NR communications technology includes the use of high-frequency spectrum bands above 24 GHz, which may be referred to as mmW. The use of these bands enable extremely high data rates and significant increases in data processing capacity. However, compared to LTE, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, may change the channel conditions between the base station (BS) and the user equipment (UE), and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. The isotropic path loss and the propagation characteristics of the mmWave environment, however, demands a dense next generation node base station (gNBs) (i.e., base stations in NR technology) deployment to guarantee line-of-sight links at any given time and to decrease the outage probability. In such deployments, equipping each such gNBs with a wired backhaul link (e.g., fiber) may not be feasible due to the high expense involved. As such, network operators have considered using wireless backhaul as a more cost-effective alternative solution for high-density deployment scenarios. However, utilization of wireless backhaul communication introduces additional implementation challenges, including interference management.

Facilitating wireless backhaul communication may include utilizing IAB nodes (which may include "relay nodes") that may have both a base station (gNB)-type and user equipment (UE)-type functionalities. The IAB nodes provide the wireless communications system flexibility such that only a fraction of gNBs may be equipped with a traditional wired backhaul capabilities (e.g., using cable or optical fiber), while the rest of the gNBs (or IAB nodes) may have direct or indirect (e.g., via relay nodes) wireless connections to the wired backhaul, e.g., possibly through multiple hops via one or more relay nodes. According to the 3GPP agreements, NR cellular networks with IAB functionalities may be characterized by (i) the possibility of using the mmWave spectrum; (ii) the integration of the access and backhaul technologies (i.e., using the same spectral resources and infrastructures to serve both mobile terminals in access as well as the NR gNBs in backhaul); and, (iii) the possibility of deploying plug-and-play IAB nodes capable of self-configuring and self-optimizing themselves.

To this end, the IAB nodes may include the gNB-type functionality that allows for transmission and reception of signals to and from child nodes (e.g., UE or another IAB node) through an access link. Additionally, the IAB nodes may also include the UE-type functionality that allows for transmission and reception of signals to and from parent node (e.g., gNB or another IAB node) through backhaul links. By utilizing an IAB nodes, a common architecture, waveforms, and procedures may be shared for access links and backhaul links, thereby reducing the system complexity. For example, the IAB nodes may share the same wireless resources (e.g., via TDM or FDM) between the access links and backhaul links.

In a full-duplex time slot, the full-duplex IAB-node may simultaneously (using the same time slot and shared resources) transmit uplink traffic towards the parent backhaul node, and receive uplink from one or more of the IAB child-node or a UE. Conversely, the full-duplex IAB-node may also simultaneously transmit a downlink traffic towards the child-node while receiving the downlink packet from the parent node during the same slot. In some systems, the 3GPP agreements provide a downlink preemption indication for enhanced mobile broadband (eMBB) multiplexing. Specifically, for an eMBB UE, if URLLC data is transmitted during the regular scheduled downlink (e.g., URLLC data is prioritized for transmission), a downlink preemption is indicated by the serving cell to the UE in a subsequent group-common DCI (GC-DCI) that is monitored by one or more UEs using an radio resource control (RRC) configured interruption-radio network temporary identifier (RNTI). However, a group-common DCI is not available in the instance of an uplink communication that may be impacted due to uplink URLLC traffic.

Accordingly, aspects of the present disclosure provide techniques for transmitting an uplink preemption indication in an IAB system identifying the resources or symbols that may be punctured by the IAB in order to minimize self-interference at an IAB node when an URLLC packet is received at the IAB node from one of a child IAB node or a UE during an on-going uplink transmission from an IAB node to a parent backhaul node.

For example, during an on-going slot-level scheduled uplink transmission from an IAB node to a parent node where the slot can also be used by the IAB node to receive uplink traffic from one or more of UE or IAB child node, a reception of an urgent URLLC uplink traffic at the IAB node with mini-slot scheduling (e.g., partial subframe overlapping) may result in the IAB experiencing self-interference (e.g., the transmission on overlapping resources may be impacted or interfered). To remedy this situation, the IAB node may puncture the PUSCH towards the parent backhaul node for the one or more symbols (or resources) that were used by the UE or IAB child node in transmission of the urgent URLLC traffic to the IAB node based on one or more techniques outlined below. Puncturing is the process of removing one or more of the parity bits after encoding with an error-correction code. Puncturing may also be used in wireless communication during the rate matching process.

For instance, in accordance with the first technique, the uplink preemption indication resource configuration may rely on resources of a subsequently transmitted physical uplink control channel for transmission of the uplink preemption indication. Specifically, in some instances, when scheduling a PUSCH transmission from the IAB node towards the parent backhaul node using DCI, the IAB node may additionally indicate PUCCH resource(s) in the same DCI that may be used by the IAB node for the preemption indication. As such, if during a first time slot, one or more symbols of the PUSCH associated with uplink traffic from the IAB node to the parent backhaul node are punctured by the IAB node in order to accommodate reception of an urgent URLLC uplink traffic from the child-node/UE on the overlapping resources (e.g., in portions of the slot and resources that may be shared for simultaneous uplink transmission to the parent node and reception from the child node), the IAB node may signal the uplink preemption indication to the parent node the symbol(s) that were punctured or impacted. As discussed, in one instance, such uplink preemption indication may be transmitted in resources of PUCCH transmitted during a second time period that were previously reserved in the DCI scheduling the PUSCH transmission during a first time period. In some examples, the uplink preemption indication may contain both PUCCH resource set ID and the PUCCH resource ID. In other instances, the uplink preemption indication may only contain PUCCH resource ID, where the PUCCH resource set ID may be presented or RRC configured. In some instances, the indicated PUCCH resource may also have a time-domain offset from the last symbol of the PUSCH to the first symbol of the PUCCH resource. In such instance, the time-domain offset may also be indicated by either the uplink grant, predetermined in standards, or RRC configured. In further examples, the uplink preemption indication may be either a slot level of transport block level (e.g., for PUCCH formats with small payloads), or symbol level and/or frequency-range level indication (e.g., for PUCCH formats with large payloads).

In another example, in accordance with aspects of the second technique, the uplink preemption indication may be resource configured with reserved resource elements in the PUSCH that is punctured by the IAB node. Specifically, in some instances, scheduled resources for PUSCH transmission (e.g., uplink traffic from IAB node to the parent backhaul node) may contain one or more reserved resource elements that may be used for uplink preemption indication. In some instances, the resource elements may be located in one or more last symbol(s) of the resource for the PUSCH that may not be used for urgent URLLC traffic (e.g., that may not be punctured to accommodate uplink traffic from child node). Although aspects of the present disclosure discuss the reserved resource elements being located in one or more last symbol(s), it should be appreciated by a person of ordinary skill in the art that the reserved resource elements in the PUSCH to carry uplink preemption indication may be located in any or partial symbols of the PUSCH. In some instances, the existence, the number, and location of the reserved resource elements may be configured or indicated by the parent-node, or predetermined in the standards. In some instances, the preemption indication may be based on digital payloads and/or sequence(s). For example, as noted above, the uplink preemption indication may be either a slot level of transport block level (e.g., for small number of reserved resource elements), or symbol level and/or frequency-range level indication (e.g., for large number of reserved resource elements).

In yet another example, in accordance with aspects of the third technique, the preemption indication regarding the previous PUSCH transmission(s)/repetition(s) may be included in one or more resource elements of a subsequent PUSCH re-transmission/repetition that is transmitted from the IAB node to the parent backhaul node during a second time period. In such instance, the uplink preemption indication may indicate which previously transmitted RV, repetition, or symbol was affected by the puncturing.

In yet another example, in accordance with aspects of the fourth technique, the preemption indication resource configuration may be included in the media access control (MAC) control element (MAC-CE) message comprised by a following PUSCH with hybrid automatic repeat request (HARQ)-ID. In some examples, the MAC-CE based preemption indication may include an indication regarding which previously transmitted RV or repetition is affected and which symbol is affected with respect to a particular RV/repetition.

Additionally or alternatively, aspects of the present disclosure also include techniques determining whether preemption indication is needed. For example, when transmitting scheduling request (SR) from the IAB-node to the Parent-node, the IAB-node may use one/several bit(s) to indicate whether resource for preemption indication is needed based at least in part on whether the IAB-node considers that the corresponding resource may be used by a UE/Child-node for urgent UL URLLC traffic. In some examples, the type of uplink preemption indication may be slot-level or symbol level, and may further identify a selected technique from the plurality of techniques identified above to transmit the preemption indication. To this end, the IAB-node may identify the number and location of reserved resource elements to be used for preemption indication, and PUCCH format and/or payload size based at least in part on the type of uplink preemption indication. Furthermore, the IAB-node may transmit an SR to the second node to indicate a puncturing technique that was applied by the first node from a plurality of puncturing techniques available. Specifically, the SR may indicate the specific one of the above solutions that was applied with respect to uplink preemption indication.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100 for uplink preemption indication in an IAB system. The wireless communications system 100 may include one or more base stations 102, one or more UEs 104, and a core network, such as an Evolved Packet Core (EPC) 180 and/or a 5G core (5GC) 190. The one or more base stations 102 and/or UEs 104 may operate according to millimeter wave (mmW or mmWave) technology. For example, mmW technology includes transmissions in mmW frequencies and/or near mmW frequencies. Specifically, extremely high frequency (EHF) is part of the radio frequency (RF) in the electromagnetic spectrum where the EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave.

As noted above, communications using the mmW and/or near mmW radio frequency band have extremely high path loss and a short range. Thus, the propagation characteristics of the mmWave environment demands deployment of dense gNBs 102 (i.e., base stations 102 in NR technology) to guarantee line-of-sight links at any given time and decrease the probability of outage. However, providing each such gNBs 102 with a wired backhaul link 132 may not be economically feasible. Thus, an alternative wireless backhaul 164 has been considered that utilizes IAB nodes 150 for facilitating 5G communications.

In some examples, the IAB nodes 150 may include both gNB-type functionality and the UE-type functionality. The IAB nodes 150 afford the wireless communications system 100 flexibility such that only a fraction of gNBs (e.g., base stations 102-a, 102-b) may be equipped with a traditional fiber-like wired 132 backhaul capabilities, while the rest of the gNBs (e.g., IAB nodes 150) may act as relays that are connected to the fiber infrastructures wirelessly 164, possibly through multiple hops. In some examples, the one or more IAB nodes 150 may include a uplink preemption indication component 450 (see FIG. 4) for transmitting an uplink preemption indication in an IAB system identifying the resources or symbols that may be punctured by the IAB in order to minimize self-interference at an IAB node 150 when an URLLC packet is received at the IAB node 150 from one of a child IAB node or a UE during an on-going uplink transmission from an IAB node to a parent backhaul node.

The EPC 180 and/or the 5GC 190 may provide user authentication, access authorization, tracking, internet protocol (IP) connectivity, and other access, routing, or mobility functions. The base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC 180 or the 5GC 190), with one another over backhaul links 132, 134 (e.g., Xn, X1, or X2 interfaces) which may be wired or wireless communication links.

The base stations 102 may wirelessly communicate with the UEs 104 via one or more base station antennas. Each of the base stations 102 may provide communication coverage for a respective geographic coverage area 110. In some examples, base stations 102 may be referred to as a base transceiver station, a radio base station, an access point, an access node, a radio transceiver, a NodeB, eNodeB (eNB), gNB, Home NodeB, a Home eNodeB, gNodeB (gNB), a relay, a transceiver function, a basic service set (BSS), an extended service set (ESS), a transmit reception point (TRP), or some other suitable terminology. The geographic coverage area 110 for a base station 102 may be divided into sectors or cells making up only a portion of the coverage area (not shown). The wireless communication network 100 may include base stations 102 of different types (e.g., macro base stations 102 or small cell base stations 180, described below).

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. The wireless communication network 100 may be a heterogeneous technology network in which different types of base stations provide coverage for various geographical regions. For example, each base station 102 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 104 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 104 with service subscriptions with the network provider. A femto cell may also cover a small geographic area (e.g., a home) and may provide restricted access and/or unrestricted access by UEs 104 having an association with the femto cell (e.g., in the restricted access case, UEs 104 in a closed subscriber group (CSG) of the base station 102, which may include UEs 104 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 104 may be dispersed throughout the wireless communication network 100, and each UE 104 may be stationary or mobile. A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 104 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 104 may be able to communicate with various types of base stations 102 and network equipment including macro eNBs, small cell eNBs, macro gNBs, small cell gNBs, gNB, relay base stations, and the like.

UE 104 may be configured to establish one or more wireless communication links 120 with one or more base stations 102. The wireless communication links 120 shown in wireless communication network 100 may carry uplink (UL) transmissions from a UE 104 to a base station 102, or downlink (DL) transmissions, from a base station 102 to a UE 104. Each wireless communication link 120 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 120 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 120 may represent one or more broadcast channels.

In some aspects of the wireless communication network 100, base stations 102 or UEs 104 may include multiple antennas for employing antenna diversity schemes to improve communication quality and reliability between base stations 102 and UEs 104. Additionally or alternatively, base stations 102 or UEs 104 may employ multiple input multiple output (MIMO) techniques that may take advantage of multi-path environments to transmit multiple spatial layers carrying the same or different coded data.

Wireless communication network 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 104 may be configured with multiple downlink CCs and one or more uplink CCs for carrier aggregation. Carrier aggregation may be used with both FDD and TDD component carriers. The communication links 120 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communication network 100 may further include base stations 102 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
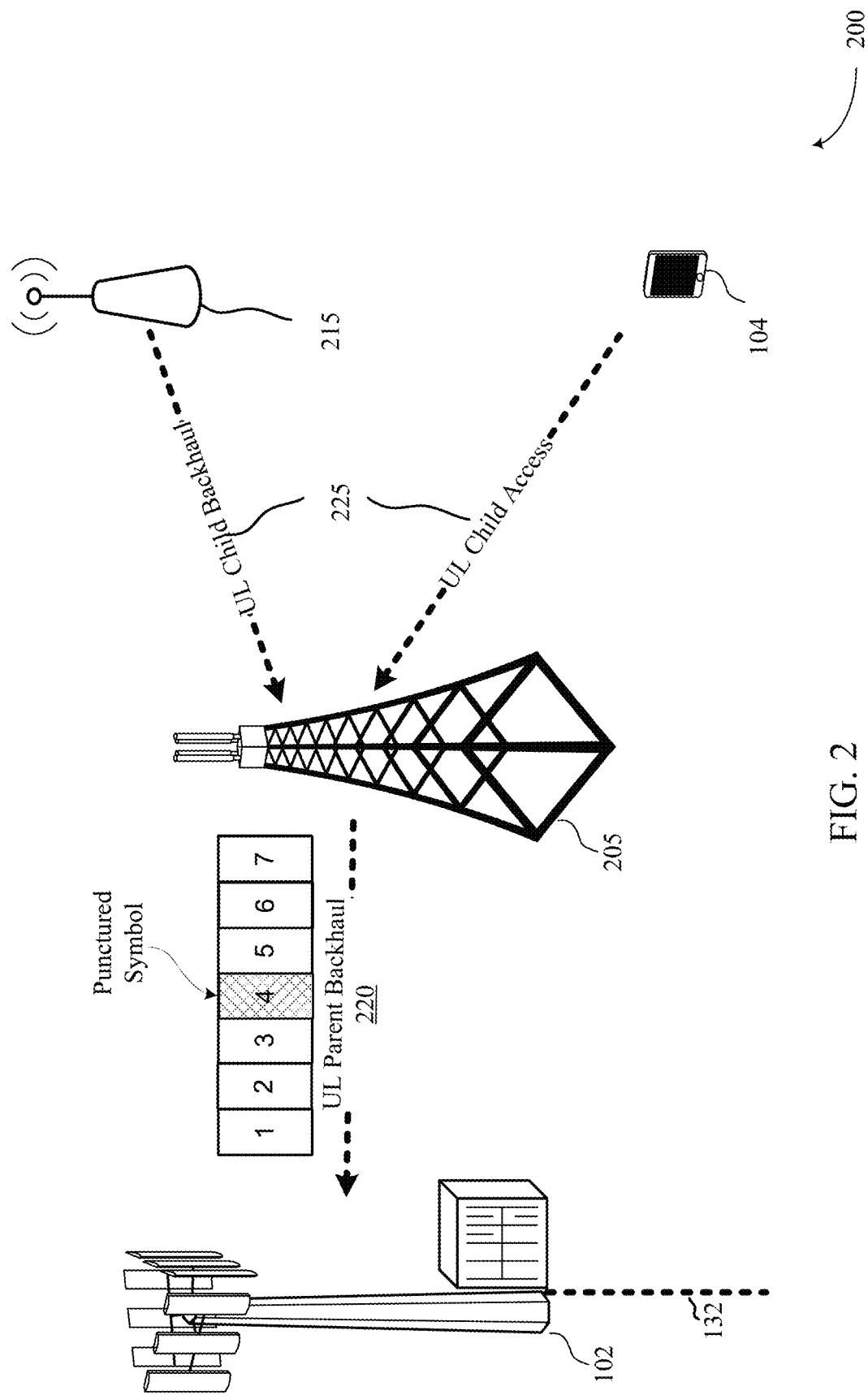
FIG. 2 is an example of a schematic diagram for transmitting an uplink preemption indication in an IAB system in accordance with aspects of the present disclosure.

Referring to FIG. 2, a schematic diagram 200 include examples of wireless communication systems that employ mmW communication in accordance with aspects of the present disclosure. The diagram 200 illustrates one or more of base stations 102 that may include traditional wired (e.g., via cable or optical fiber) backhaul capabilities 132 in addition to one or more IAB nodes 205, such as IAB node 205 and IAB node 215, which may not have the wired backhaul capability 132 and thus utilize wireless communication 164 with base station 102 to define a wireless backhaul capability. In some aspects, IAB nodes 205 may be example of one or more IAB node 150 discussed with reference to FIG. 1.

Base station 102 and/or IAB nodes 205 and 210 may serve one or more UEs 104 via respective wireless communication links 154. In some cases, IAB node 205 may be referred to as a relay node based on IAB node 205 wirelessly connecting IAB-child node 210 to the wired backhaul capability 132 of base station 102. As discussed above, one or more IAB nodes 205 and 215 that may provide both the UE-type functionality and gNB-type functionality. The UE-type functionality of the IAB node 205 or 215 may allow for transmission and reception of signals to and from parent node 102 (e.g., gNB 102 or another IAB node) through backhaul links. Conversely, the gNB-type functionality of the IAB node 205 may allow for transmission and reception of signals to and from child nodes (e.g., UE 104 or another IAB child-node 215) through an access link. As noted above, the IAB functionalities of the IAB node 205 and 215 may be characterized by (i) the utilization of the mmWave spectrum; (ii) the integration of the access and backhaul technologies (i.e., using the same spectral resources and infrastructures to serve both mobile terminals in access as well as the NR gNBs in backhaul); (iii) the possibility of deploying plug-and-play IAB nodes capable of self-configuring and self-optimizing themselves.

In some examples, IAB-node 205 may be a full-duplex IAB-node such that in full-duplex time slot, the IAB-node 205 may simultaneously or concurrently transmit uplink traffic 220 towards the parent backhaul node 102, and receive uplink 225 from one or more of the IAB child-node 215 or a UE 104. For example, during an on-going slot-level scheduled uplink transmission 220 from an IAB node 205 to a parent node 102 where the slot can also be used by the IAB node 205 to receive uplink traffic 225 from one or more of UE 104 or IAB child node 215, a reception of an urgent URLLC uplink traffic at the IAB node 205 from the one or more of UE 104 or IAB child node 215 with mini-slot scheduling may result in the IAB-node 205 experiencing self-interference (e.g., the transmission on overlapping resources may be impacted or interfered). To remedy this situation, the IAB node 205 may puncture the PUSCH towards the parent backhaul node 102 for the one or more symbols (or resources) (e.g., symbol 4 in FIG. 2) that were used by the UE 104 or IAB child node 215 in transmission of the urgent URLLC traffic 225 to the IAB node 205 based on one or more techniques outlined below.

Figure 3A:
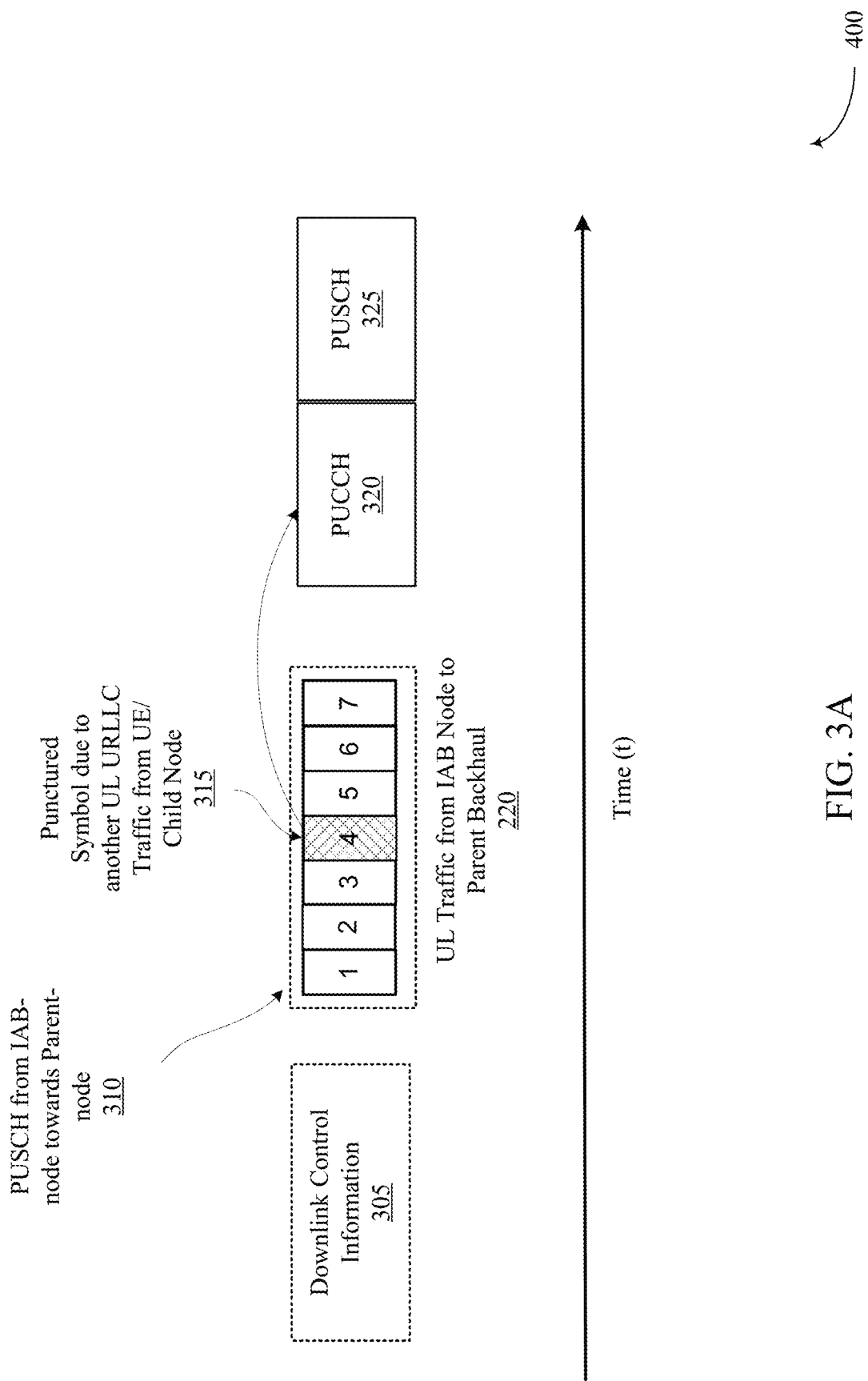
FIG. 3A is an example technique for transmitting an uplink preemption indication over resources reserved in PUCCH that are indicated in the previously transmitted DCI in accordance with aspects of the present disclosure.

FIG. 3A is a timing diagram 300 of a first technique for transmitting an uplink preemption indication over resources reserved in PUCCH 320 that are indicated in the previously transmitted DCI 305 in accordance with aspects of the present disclosure. Specifically, in some instances, in order to schedule a PUSCH transmission 310, the IAB-node 205 may transmit a DCI 305 to the parent node 102 in order to identify resources for the PUSCH 310. In accordance with aspects of the present disclosure, the DCI 305 may additionally indicate PUCCH resource(s) 320 in the same DCI 305 that may be used by the IAB node 205 for the preemption indication for any symbol(s) 315 that may be punctured by the IAB node 205 in the PUSCH 310 transmitted during the first time period.

As such, if during a first time slot, one or more symbols of the PUSCH associated with uplink traffic from the IAB node to the parent backhaul node are punctured 315 (e.g., symbol 4) by the IAB node 205 in order to accommodate reception of an urgent URLLC uplink traffic from the child-node 215/UE 104 on the overlapping resources, the IAB node 205 may signal the uplink preemption indication to the parent node 102 of the one or more symbol(s) 315 that were punctured or impacted.

As discussed, in one instance, such uplink preemption indication may be transmitted in resources of PUCCH 320 transmitted during a second time period that were previously reserved in the DCI 305 for scheduling the PUSCH 310 transmission during a first time period. In some examples, the uplink preemption indication may contain both PUCCH resource set ID and the PUCCH resource ID. In other instances, the uplink preemption indication may only contain PUCCH resource ID, where the PUCCH resource set ID may be presented or RRC configured. In some instances, the indicated PUCCH resource may also have a time-domain offset from the last symbol of the PUSCH to the first symbol of the PUCCH resource. In such instance, the time-domain offset may also be indicated by either the uplink grant, predetermined in standards, or RRC configured. In further examples, the uplink preemption indication may be either a slot level of transport block level (e.g., for PUCCH formats with small payloads), or symbol level and/or frequency-range level indication (e.g., for PUCCH formats with large payloads).

Figure 3B:
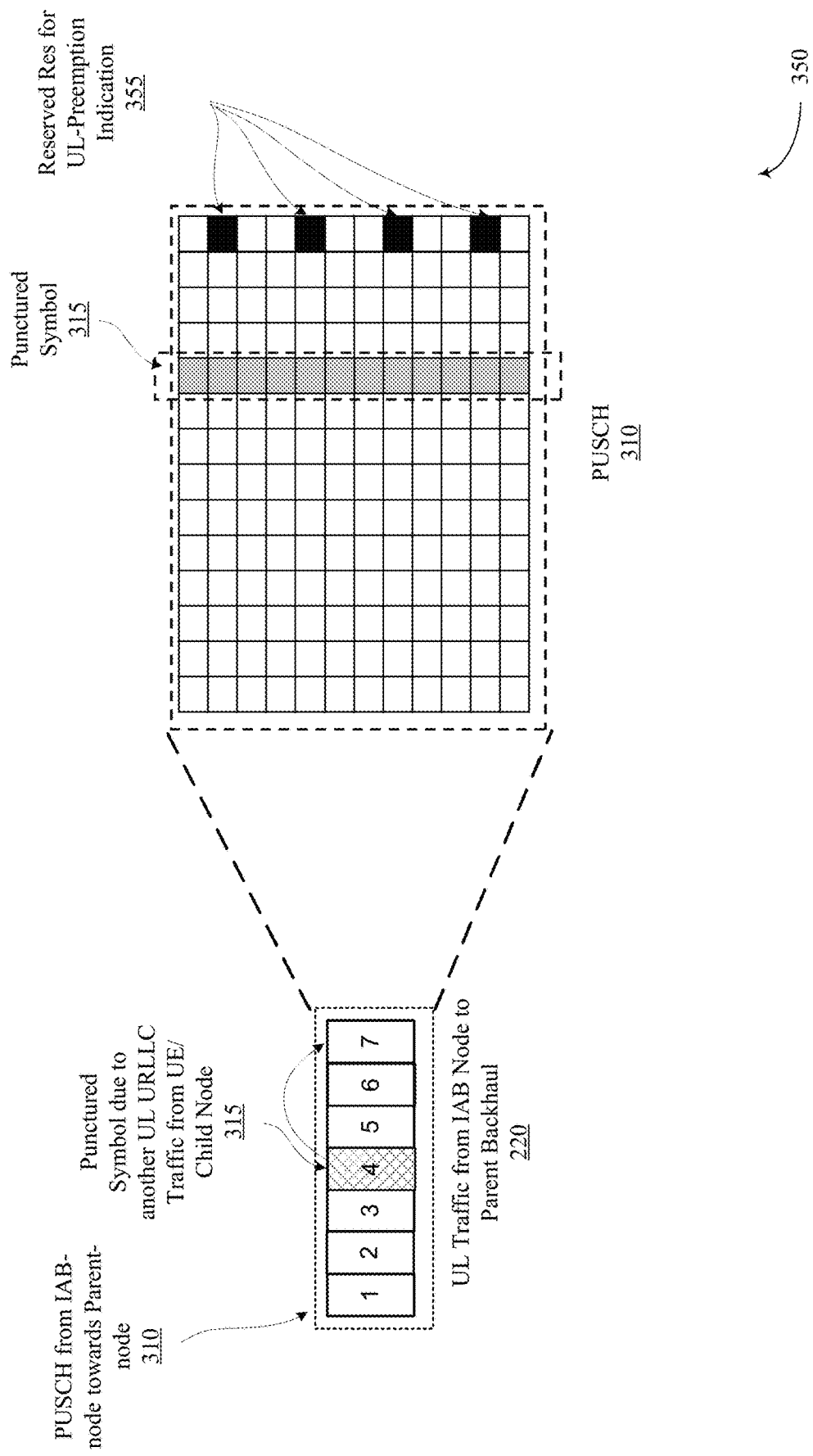
FIG. 3B is example of another technique for transmitting an uplink preemption indication in the reserved resource elements of the PUSCH for which the IAB node has punctured resources in accordance with aspects of the present disclosure.

FIG. 3B is an example of another technique for transmitting an uplink preemption indication in accordance with aspects of the present disclosure. Specifically, once the IAB node 205 punctures one or more symbols 315 of the uplink transmission PUSCH 310 from the IAB node 205 to the parent node 102 in order to accommodate the urgent URLLC uplink packet from one of child node 215 or UE 104, the IAB node 205 may utilize one or more reserved resource elements 355 of the PUSCH 310 for which the IAB node to identify the punctured resources to the parent node 102.

Particularly, in some instances, scheduled resources for PUSCH transmission 310 (e.g., uplink traffic from IAB node 205 to the parent backhaul node 102) may contain one or more reserved resource elements 355 that may be used for uplink preemption indication. In some instances, the resource elements 355 may be located in one or more last symbol(s) of the resource for the PUSCH 310 that may not be used for urgent URLLC traffic (e.g., that may not be punctured to accommodate uplink traffic from child node). Furthermore, in some examples, the existence, the number, and location of the reserved resource elements 355 may be configured or indicated by the parent-node 102, or predetermined in the standards. In some instances, the preemption indication may be based on digital payloads and/or sequence (s). For example, as noted above, the uplink preemption indication may be either a slot level of transport block level (e.g., for small number of reserved resource elements), or symbol level and/or frequency-range level indication (e.g., for large number of reserved resource elements).

Figure 3C:
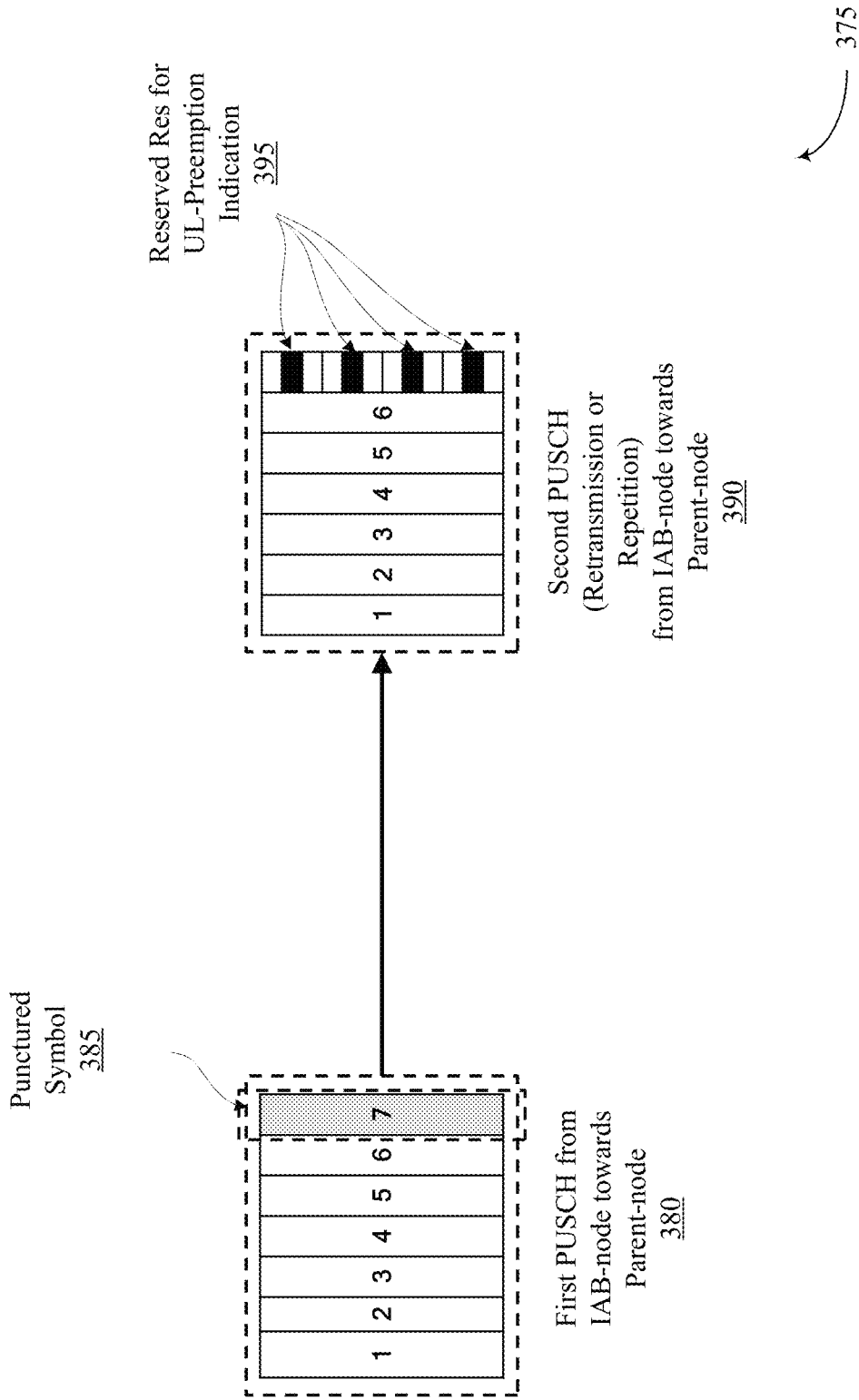
FIG. 3C is example of another technique for transmitting an uplink preemption indication in the reserved resource elements of the retransmitted or repeated PUSCH transmission in accordance with aspects of the present disclosure.

FIG. 3C is another example of a technique for transmitting an uplink preemption indication in accordance with aspects of the present disclosure. Specifically, in some instances, the preemption indication regarding the previous PUSCH transmission(s) 380 may be included in one or more resource elements 395 of a subsequent PUSCH 390 re-transmission/repetition that is transmitted from the IAB node 205 to the parent backhaul node 102 during a second time period. In such instance, the uplink preemption indication may indicate which previously transmitted RV, repetition, or symbol was affected by the puncturing.

Furthermore, although not illustrated, additional techniques for transmitting the uplink preemption indication resource configuration may include the MAC-CE message comprised by a following PUSCH with HARQ-ID. In some examples, the MAC-CE based preemption indication may include an indication regarding which previously transmitted RV or repetition is affected and which symbol is affected with respect to a particular RV/repetition.

Additionally or alternatively, aspects of the present disclosure also include techniques determining whether preemption indication is needed. For example, when transmitting SR from the IAB-node to the Parent-node, the IAB-node may use one/several bit(s) to indicate whether resource for preemption indication is needed based at least in part on whether the IAB-node considers that the corresponding resource may be used by a UE/Child-node for urgent UL URLLC traffic. In some examples, the type of uplink preemption indication may be slot-level or symbol level, and may further identify a selected technique from the plurality of techniques identified above to transmit the preemption indication. To this end, the IAB-node may identify the number and location of reserved resource elements to be used for preemption indication, and PUCCH format and/or payload size based at least in part on the type of uplink preemption indication.

Figure 4:
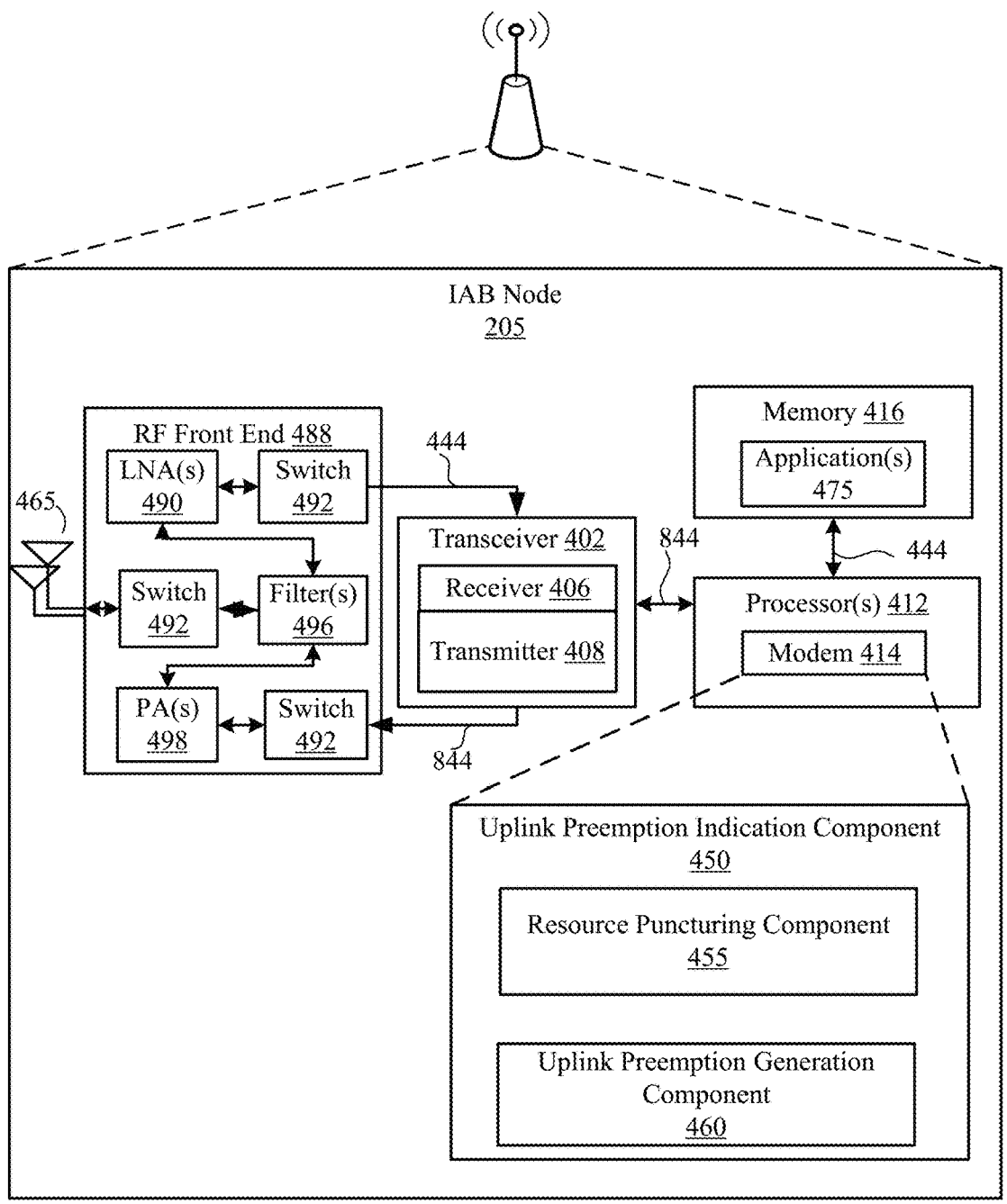
FIG. 4 is a schematic diagram of an example implementation of various components of an IAB node in accordance with various aspects of the present disclosure.

FIG. 4 illustrates a hardware components and subcomponents of a device that may be IAB node 150 or 205 for implementing one or more methods (e.g., method 500) described herein in accordance with various aspects of the present disclosure. For example, one example of an implementation of the IAB node 205 may include a variety of components, some of which have already been described above, but including components such as one or more processors 412, memory 416 and transceiver 402 in communication via one or more buses 444, which may operate in conjunction with the uplink preemption indication component 450 to perform functions described herein related to including one or more methods (e.g., 500) of the present disclosure.

In some examples, the uplink preemption indication component 450 may include a resource puncturing component 455 puncturing at least a portion of a resource of the PUSCH for the uplink traffic from the IAB to the parent backhaul node during the first time slot based on reception of the urgent URLLC traffic at the IAB node. The uplink preemption indication component 450 may further include uplink preemption generation component 460 for generating and transmitting an uplink preemption indication from the IAB node to the parent backhaul node identifying at least the portion of the resource that is punctured by the IAB node.

The one or more processors 412, modem 414, memory 416, transceiver 402, RF front end 488 and one or more antennas 465, may be configured to support voice and/or data calls (simultaneously or non-simultaneously) in one or more radio access technologies. In an aspect, the one or more processors 412 may include a modem 414 that uses one or more modem processors. The various functions related to uplink preemption indication component 450 may be included in modem 414 and/or processors 412 and, in an aspect, may be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with timing management component 850 may be performed by transceiver 402. The one or more antennas 465 may include stand-alone antennas and/or antenna arrays.

The memory 416 may be configured to store data used herein and/or local versions of application(s) 475 or uplink preemption indication component 450 and/or one or more of its subcomponents being executed by at least one processor 412. The memory 416 may include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining uplink preemption indication component 450 and/or one or more of its subcomponents, and/or data associated therewith, when the IAB node 150 is operating at least one processor 412 to execute timing management component 850 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one UE 104. Additionally, receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may including, but is not limited to, an RF transmitter.

Moreover, in an aspect, transmitting device may include the RF front end 488, which may operate in communication with one or more antennas 865 and transceiver 802 for receiving and transmitting radio transmissions, for example, wireless communications transmitted by at least one base station 102, other IAB nodes 150 or wireless transmissions transmitted to and by UE 104. The RF front end 888 may be connected to one or more antennas 465 and may include one or more low-noise amplifiers (LNAs) 490, one or more switches 492, one or more power amplifiers (PAs) 498, and one or more filters 496 for transmitting and receiving RF signals.

In an aspect, the LNA 490 may amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 488 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 may be used by the RF front end 488 to filter a received signal to obtain an input RF signal. Similarly, in an aspect, for example, a respective filter 496 may be used to filter an output from a respective PA 498 to produce an output signal for transmission. In an aspect, each filter 496 may be connected to a specific LNA 490 and/or PA 498. In an aspect, the RF front end 488 may use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 488. In an aspect, the transceiver 402 may be tuned to operate at specified frequencies such that transmitting device may communicate with, for example, one or more base stations 102 or one or more cells associated with one or more base stations 102. In an aspect, for example, the modem 414 may configure the transceiver 402 to operate at a specified frequency and power level based on the configuration of the transmitting device and the communication protocol used by the modem 414.

In an aspect, the modem 414 may be a multiband-multimode modem, which may process digital data and communicate with the transceiver 402 such that the digital data is sent and received using the transceiver 402. In an aspect, the modem 414 may be multiband and be configured to support multiple frequency bands for a specific communications protocol. In an aspect, the modem 414 may be multimode and be configured to support multiple operating networks and communications protocols. In an aspect, the modem 414 may control one or more components of transmitting device (e.g., RF front end 488, transceiver 402) to enable transmission and/or reception of signals from the network based on a specified modem configuration. In an aspect, the modem configuration may be based on the mode of the modem 414 and the frequency band in use. In another aspect, the modem configuration may be based on UE configuration information associated with transmitting device as provided by the network during cell selection and/or cell reselection.

Figure 5:
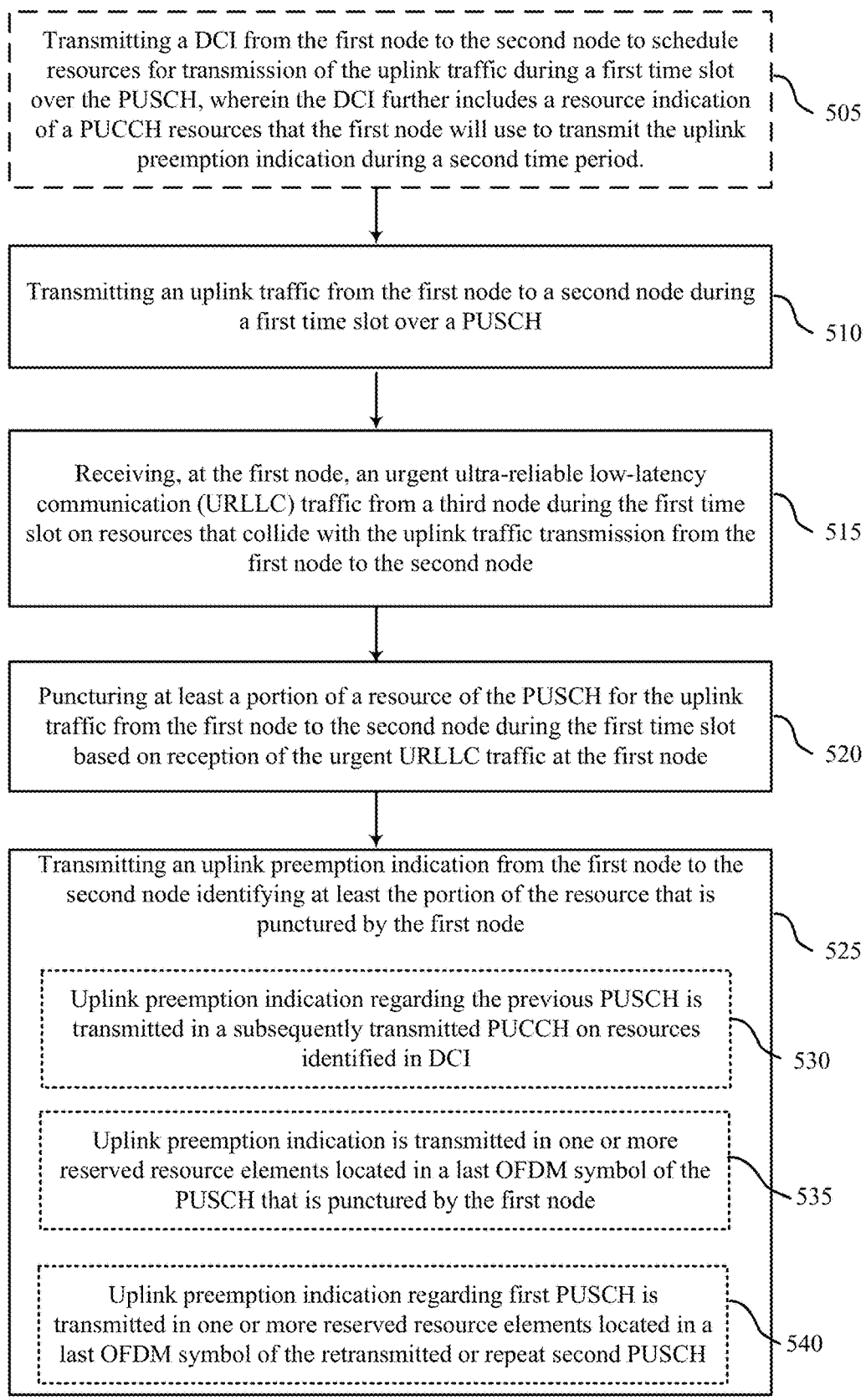
FIG. 5 is a flow diagram of an example of a method of wireless communication implemented by the IAB node in accordance with aspects of the present disclosure.

FIG. 5 is a flowchart of an example method 500 for wireless communications in accordance with aspects of the present disclosure. The method 500 may be performed using the IAB node 150 or 205 discussed with reference to FIGS. 1 and 2. Although the method 500 is described below with respect to the elements of the IAB node, other components may be used to implement one or more of the steps described herein. The IAB node may include both a base station type functionality that allows for transmission and reception to and from the child node and a UE-type functionality that allows for transmission and reception to and from a parent node.

At block 505, the method 500 may optionally include transmitting a DCI from the first node to the second node to schedule resources for transmission of the uplink traffic during a first time slot over the PUSCH. In some examples, the DCI may further include a resource indication of a PUCCH resources that the first node will use to transmit the uplink preemption indication during a second time period. Aspects of block 505 may be performed by transceiver 402 described with reference to FIG. 4. The modem 450 of the IAB node 150 may generate and send the DCI to the transceiver 402 or the transmitter 408 of the IAB node 150. The transceiver 402 or the transmitter 408 may convert the data into electrical signals. The RF front end 488 may filter and/or amplify the electrical signals into the electro-magnetic signals. The one or more antennas 465 of the IAB node 150 may transmit the electro-magnetic signals associated with the DCI to the parent node 102. Thus, the modem 450, the transceiver 402, the transmitter 408, the RF front end 488, the one or more antennas 465, the one or more processors 412, and/or the IAB node 150 or one of its subcomponents may define the means for transmitting a DCI from the first node to the second node to schedule resources for transmission of the uplink traffic during a first time slot over the PUSCH.

At block 510, the method 500 may include transmitting an uplink traffic from the first node to a second node during a first time slot over a PUSCH. Aspects of block 510 may be performed by transceiver 402 described with reference to FIG. 4. The modem 450 of the IAB node 150 may generate data for transmission to the transceiver 402 or the transmitter 408 of the IAB node 150. The transceiver 402 or the transmitter 408 may convert the data into electrical signals. The RF front end 488 may filter and/or amplify the electrical signals into the electro-magnetic signals. The one or more antennas 465 of the IAB node 150 may transmit the electro-magnetic signals associated with the uplink traffic to the parent node 102 over the PUSCH. Thus, the modem 450, the transceiver 402, the transmitter 408, the RF front end 488, the one or more antennas 465, the one or more processors 412, and/or the IAB node 150 or one of its subcomponents may define the means for transmitting an uplink traffic from the first node to a second node during a first time slot over a PUSCH.

At block 515, the method 500 may include receiving, at the first node, an urgent URLLC traffic from a third node during the first time slot on resources that collide with the uplink traffic transmission from the IAB node to the parent backhaul node. In some examples, the first node may be an IAB node, the second node may be an IAB parent backhaul node, and the third node may be one or more of child IAB node or UE. Aspects of block 515 may be performed by the transceiver 402 and more particularly the receiver 406 described with reference to FIG. 4. For example, the one or more antennas 465 of the IAB node 150 may receive electro-magnetic signals associated with the URLLC traffic. The RF front end 488 of the IAB node 150 may filter, amplify, and/or extract electrical signals carried by the electro-magnetic signals. The transceiver 402 or the receiver 406 of the IAB node 150 may digitize and convert the electrical signals into data, such as the URLLC traffic from the child node, and send to the modem 450 of the IAB node 150. Thus, the modem 450, the transceiver 402, the transmitter 408, the RF front end 488, the one or more antennas 465, the one or more processors 412, and/or the IAB node 150 or one of its subcomponents may define the means for receiving, at the first node, an urgent URLLC traffic from the third node during the first time slot on resources that collide with the uplink traffic transmission from the first node to the second node.

At block 520, the method 500 may include puncturing at least a portion of a resource of the PUSCH for the uplink traffic from the first node to the second node during the first time slot based on reception of the urgent URLLC traffic at the IAB node. Aspects of block 520 may be performed by the resource puncturing component 455 in conjunction with the transceiver 402 as described with reference to FIG. 4. For example, the resource puncturing component 455 may identify the one or more symbols of uplink traffic from the first node to the second node that were impacted by the reception of the urgent URLLC from a third node. Based on the determination, the resource puncturing component 455, the uplink preemption indication component 450, modem 414, and/or processor 412 may puncture the one or more resource elements or symbols that were used by the child node/UE for URLLC. Thus, resource puncturing component 455, the uplink preemption indication component 450, modem 414, processor 412, and/or the IAB node 150 or one of its subcomponents may define puncturing at least a portion of a resource of the PUSCH for the uplink traffic from the first node to the second node during the first time slot based on reception of the urgent URLLC traffic at the first node.

At block 525, the method 500 may include transmitting an uplink preemption indication from the first node to the second node identifying at least the portion of the resource that is punctured by the first node. In some examples, the uplink preemption indication may be one of a slot level or a transport block level indication. In other examples, the uplink preemption indication may be one of a symbol level or a frequency-range level indication. The modem 450 of the IAB node 150 may generate the uplink preemption indication (e.g., message or signal) for transmission to the transceiver 402 or the transmitter 408 of the IAB node 150. The transceiver 402 or the transmitter 408 may convert the uplink preemption indication into electrical signals. The RF front end 488 may filter and/or amplify the electrical signals into the electro-magnetic signals. The one or more antennas 465 of the IAB node 150 may transmit the electro-magnetic signals associated with the uplink preemption indication to the parent node 102. Thus, the modem 450, the transceiver 402, the transmitter 408, the RF front end 488, the one or more antennas 465, the one or more processors 412, and/or the IAB node 150 or one of its subcomponents may define the means for transmitting an uplink preemption indication from the first node to the second node identifying at least the portion of the resource that is punctured by the first node.

In some examples, as described in sub-block 530, the method 500 may optionally include transmitting the uplink preemption indication regarding the previous PUSCH in a subsequently transmitted PUCCH on resources identified in DCI. Specifically, as noted above with reference to block 505, a DCI may schedule resources for transmission of the uplink traffic during a first time slot over the PUSCH. In some examples, the DCI may further include a resource indication of a PUCCH resources that the first node may use to transmit the uplink preemption indication during a second time period. In some examples, the resource indication may include identification of both of a PUCCH resource set ID and the PUCCH resource ID within the PUCCH resource set ID. In other instances, the resource indication may include identification of only a PUCCH resource ID within a PUCCH resource set ID. In such case, the PUCCH resource set ID that is omitted from the resource indication may be predetermined between the first node and the second node. In some examples, the resource indication identifies a time-domain offset from a last symbol of the PUSCH that is punctured to a first symbol of the PUCCH resource that the IAB node will utilize for transmitting the uplink preemption indication.

At sub-block 535, the method 500 may optionally or alternatively include transmitting the uplink preemption indication during the first time slot in one or more reserved resource elements located in a last OFDM symbol of the PUSCH that is punctured by the first node. In some examples, the PUSCH may be rate-matched based on the one or more reserved resource elements (e.g., for the reserved resource element method, the IAB-node may rate-match around the reserved resource elements when transmitting the PUSCH). However, if there is no uplink preemption indication to be included, in some examples, the reserved resource elements may be used for PUSCH. Additionally, the one or more reserved resource elements that may be used is selected from a plurality of resource element sequences (or different digital payloads) that may each identify different situations of puncturing.

At sub-block 540, the method 500 may optionally or alternatively include transmitting the uplink preemption indication corresponding to the uplink traffic transmission of the PUSCH during the first time slot in one or more reserved resource elements located in a last OFDM symbol of a second PUSCH that is transmitted to the second node during a second time period, wherein the second PUSCH transmission is a retransmission or repetition of the first PUSCH that is transmitted from the first node to the second node. As noted above, in some examples, the PUSCH may be rate-matched based on the one or more reserved resource elements (e.g., for the reserved resource element method, the IAB-node may rate-match around the reserved resource elements when transmitting the PUSCH). However, if there is no uplink preemption indication to be included, in some examples, the reserved resource elements may be used for PUSCH. Additionally, the one or more reserved resource elements that may be used is selected from a plurality of resource element sequences (or different digital payloads) that may each identify different situations of puncturing.

Furthermore, the method 500 may optionally include transmitting the uplink preemption indication corresponding to the uplink traffic transmission of the PUSCH during the first time slot in a MAC-CE message by a second PUSCH transmitted to the parent backhaul node during a second time period.

Additionally or alternatively, in some examples, the uplink preemption indication may be transmitted in via a demodulation reference signal (DMRS) that is transmitted to the second node, wherein the DMRS is selected from a plurality of DMRS sequences that each indicates a different puncturing technique. In other words, instead of using reserved resource elements for UL-PI, DMRS can be used alternatively. If there is no UL-preemption that is encountered, legacy DMRS sequence may be used. However, if UL-preemption is encountered, other DMRS sequence(s) may be used to identify UL-PI details (e.g., what symbols are punctured). In some aspects, the DMRS-based solution can also be based on the current PUSCH, or a retransmitted/repeated PUSCH, or another HARQ-process's PUSCH.

Finally, in some examples, the method may further include transmitted configurations associated with the plurality of DMRS sequences in a scheduling request from one of the first node to the second node, or the second node to the first node. Specifically, the specific configuration of the meaning of the DMRS sequences, the possible allowed DMRS sequences, and the specific method, can be transmitted in the Scheduling-Request from the IAB-node to the Parent-node, and/or configured/indicated from the Parent-node to the IAB-node.

In some examples, the method 500 may further comprise determining, at the first node, whether resources for the uplink preemption indication are needed based at least in part on a determination whether the resources can be used by the at least one of the child IAB node or the UE for uplink transmission of the urgent URLLC traffic. The method 500 may further include transmitting a scheduling request from the IAB node to the parent backhaul node to indicate whether the resources for the uplink preemption indication are allocated based on the determining. In some aspects, the uplink preemption indication may indicate whether the preemption is slot-level or symbol level, and additionally identify one of the techniques discussed above that the parent-node is to use for receiving and decoding the uplink preemption indication. The first node may further identify the number and location of reserved resource elements for the preemption indication.

Figure 6:
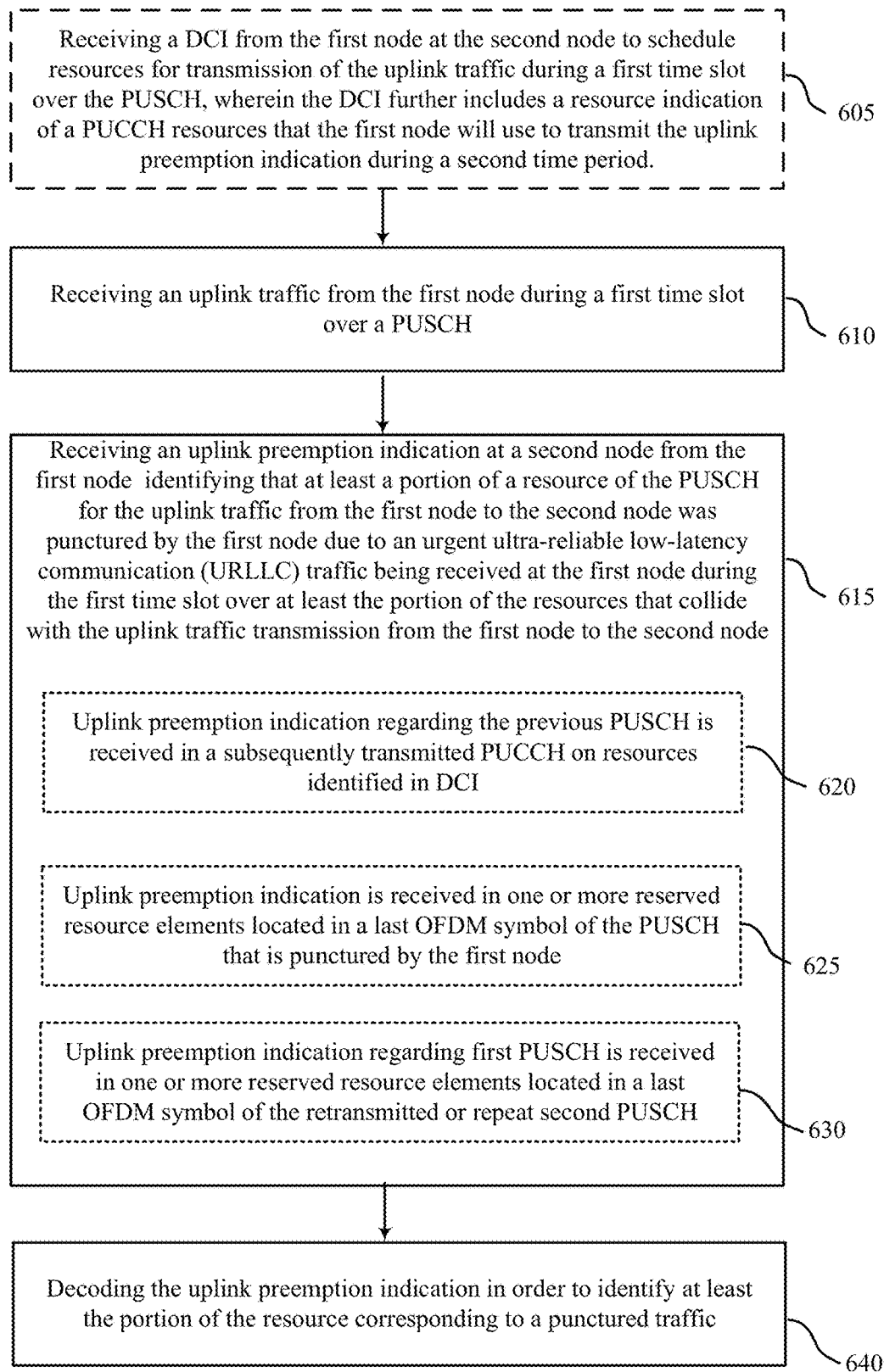
FIG. 6 is a flow diagram of an example of a method of wireless communication implemented by the IAB parent node in accordance with aspects of the present disclosure.

FIG. 6 is a flowchart of an example method 600 for wireless communications in accordance with aspects of the present disclosure. The method 600 may be performed using the IAB parent node (e.g., parent node 102) discussed with reference to FIGS. 1 and 2. Although the method 600 is described below with respect to the elements of the IAB-parent node, other components may be used to implement one or more of the steps described herein. The IAB parent node may include both a base station type functionality that allows for transmission and reception to and from the child node and a UE-type functionality that allows for transmission and reception to and from a parent node.

At block 605, the method 600 may optionally include receiving a DCI from the first node to the second node to schedule resources for transmission of the uplink traffic during a first time slot over the PUSCH. In some examples, the DCI may further include a resource indication of a PUCCH resources that the first node will use to transmit the uplink preemption indication during a second time period. Aspects of block 605 may be performed by transceiver 402 described with reference to FIG. 4. The modem 450 of the IAB node 150 may generate and send the DCI to the transceiver 402 or the transmitter 408 of the IAB node 150. The transceiver 402 or the transmitter 408 may convert the data into electrical signals. The RF front end 488 may filter and/or amplify the electrical signals into the electro-magnetic signals. The one or more antennas 465 of the IAB node 150 may transmit the electro-magnetic signals associated with the DCI to the parent node 102. Thus, the modem 450, the transceiver 402, the transmitter 408, the RF front end 488, the one or more antennas 465, the one or more processors 412, and/or the IAB node 150 or one of its subcomponents may define the means for receiving a DCI from the first node to the second node to schedule resources for transmission of the uplink traffic during a first time slot over the PUSCH.

At block 610, the method 600 may include receiving an uplink preemption indication at a second node from the first node identifying that at least a portion of a resource of the PUSCH for the uplink traffic from the first node to the second node was punctured by the first node due to an urgent URLLC traffic being received at the first node during the first time slot over at least the portion of the resources that collide with the uplink traffic transmission from the first node to the second node. Aspects of block 610 may be performed by the transceiver 402 and more particularly the receiver 406 described with reference to FIG. 4. For example, the one or more antennas 465 of the IAB node 150 may receive electro-magnetic signals associated with the uplink traffic. The RF front end 488 of the IAB node 150 may filter, amplify, and/or extract electrical signals carried by the electro-magnetic signals. The transceiver 402 or the receiver 406 of the IAB parent node 150 may digitize and convert the electrical signals into data, such as the uplink traffic from the IAB node, and send to the modem 450 of the IAB node 150. Thus, the modem 450, the transceiver 402, the transmitter 408, the RF front end 488, the one or more antennas 465, the one or more processors 412, and/or the IAB node 150 or one of its subcomponents may define the means for receiving an uplink preemption indication at a second node from the first node identifying that at least a portion of a resource of the PUSCH for the uplink traffic from the first node to the second node was punctured by the first node due to an urgent URLLC traffic being received at the first node during the first time slot over at least the portion of the resources that collide with the uplink traffic transmission from the first node to the second node.

In some examples, as described in sub-block 620, the method 600 may optionally include receiving the uplink preemption indication regarding the previous PUSCH in a subsequently transmitted PUCCH on resources identified in DCI. Specifically, as noted above with reference to block 605, a DCI may schedule resources for transmission of the uplink traffic during a first time slot over the PUSCH. In some examples, the DCI may further include a resource indication of a PUCCH resources that the first node may use to transmit the uplink preemption indication during a second time period. In some examples, the resource indication may include identification of both of a PUCCH resource set ID and the PUCCH resource ID within the PUCCH resource set ID. In other instances, the resource indication may include identification of only a PUCCH resource ID within a PUCCH resource set ID. In such case, the PUCCH resource set ID that is omitted from the resource indication may be predetermined between the first node and the second node. In some examples, the resource indication identifies a time-domain offset from a last symbol of the PUSCH that is punctured to a first symbol of the PUCCH resource that the IAB node will utilize for transmitting the uplink preemption indication.

At sub-block 625, the method 600 may optionally or alternatively include receiving the uplink preemption indication during the first time slot in one or more reserved resource elements located in a last OFDM symbol of the PUSCH that is punctured by the first node. In some examples, the PUSCH may be rate-matched based on the one or more reserved resource elements (e.g., for the reserved resource element method, the IAB-node may rate-match around the reserved resource elements when transmitting the PUSCH). However, if there is no uplink preemption indication to be included, in some examples, the reserved resource elements may be used for PUSCH. Additionally, the one or more reserved resource elements that may be used is selected from a plurality of resource element sequences (or different digital payloads) that may each identify different situations of puncturing.

At sub-block 630, the method 600 may optionally or alternatively include receiving the uplink preemption indication corresponding to the uplink traffic transmission of the PUSCH during the first time slot in one or more reserved resource elements located in a last OFDM symbol of a second PUSCH that is transmitted to the second node during a second time period, wherein the second PUSCH transmission is a retransmission or repetition of the first PUSCH that is transmitted from the first node to the second node. Again, as noted above, in some examples, the PUSCH may be rate-matched based on the one or more reserved resource elements (e.g., for the reserved resource element method, the IAB-node may rate-match around the reserved resource elements when transmitting the PUSCH). However, if there is no uplink preemption indication to be included, in some examples, the reserved resource elements may be used for PUSCH. Additionally, the one or more reserved resource elements that may be used is selected from a plurality of resource element sequences (or different digital payloads) that may each identify different situations of puncturing.

Furthermore, the method 600 may optionally include receiving the uplink preemption indication corresponding to the uplink traffic transmission of the PUSCH during the first time slot in a MAC-CE message by a second PUSCH transmitted to the parent backhaul node during a second time period.

Additionally or alternatively, in some examples, the uplink preemption indication may be received in via a demodulation reference signal (DMRS) that is transmitted to the second node, wherein the DMRS is selected from a plurality of DMRS sequences that identify at least the portion of the resource that is punctured by the first node. In other words, instead of using reserved resource elements for UL-PI, DMRS can be used alternatively. If there is no UL-preemption that is encountered, legacy DMRS sequence may be used. However, if UL-preemption is encountered, other DMRS sequence(s) may be used to identify UL-PI details (e.g., what symbols are punctured). In some aspects, the DMRS-based solution can also be based on the current PUSCH, or a retransmitted/repeated PUSCH, or another HARQ-process's PUSCH.

Finally, in some examples, the method may further include receiving configurations associated with the plurality of DMRS sequences in a scheduling request from one of the first node to the second node, or the second node to the first node. Specifically, the specific configuration of the meaning of the DMRS sequences, the possible allowed DMRS sequences, and the specific method, can be transmitted in the Scheduling-Request from the IAB-node to the Parent-node, and/or configured/indicated from the Parent-node to the IAB-node.

At block 640, the method 600 may include decoding the uplink preemption indication in order to identify at least the portion of the resource corresponding to a punctured traffic. In some examples, the first node may be an IAB node, the second node may be an IAB parent backhaul node, and the third node may be one or more of child IAB node or UE. Aspects of block 640 may be performed by the transceiver 402 and more particularly the receiver 406 described with reference to FIG. 4. For example, the one or more antennas 465 of the IAB node 150 may receive electro-magnetic signals associated with the preemption indication. The RF front end 488 of the IAB node 150 may filter, amplify, and/or extract electrical signals carried by the electro-magnetic signals. The transceiver 402 or the receiver 406 of the IAB node 150 may digitize, decode, and convert the electrical signals into data, such as the uplink preemption indication from the IAB node, and send to the modem 450 of the IAB parent node 150. Thus, the modem 450, the transceiver 402, the transmitter 408, the RF front end 488, the one or more antennas 465, the one or more processors 412, and/or the IAB node 150 or one of its subcomponents may define the means for decoding the uplink preemption indication in order to identify at least the portion of the resource corresponding to a punctured traffic.

Some Further Example Embodiments

In one example, an aspect of the present disclosure includes a method for wireless communications, comprising: transmitting an uplink traffic from the first node to a second node during a first time slot over a physical uplink shared channel (PUSCH); receiving, at the first node, an urgent ultra-reliable low-latency communication (URLLC) traffic from a third node during the first time slot on resources that collide with the uplink traffic transmission from the first node to the second node; puncturing at least a portion of a resource of the PUSCH for the uplink traffic from the first node to the second node during the first time slot based on reception of the urgent URLLC traffic at the first node; and transmitting an uplink preemption indication from the first node to the second node identifying at least the portion of the resource that is punctured by the first node.

An above example method further comprising: transmitting a downlink control information (DCI) from the first node to the second node to schedule resources for transmission of the uplink traffic during a first time slot over the PUSCH, wherein the DCI further includes a resource indication of a physical uplink control channel (PUCCH) resources that the first node will use to transmit the uplink preemption indication during a second time period.

Any of the above example methods, wherein the resource indication includes identification of both of a PUCCH resource set identification (ID) and the PUCCH resource ID within the PUCCH resource set ID.

Any of the above example methods, wherein the resource indication includes identification of a PUCCH resource identification (ID) within a PUCCH resource set ID, wherein the PUCCH resource set ID is omitted from the resource indication and is predetermined between the first node and the second node.

Any of the above example methods, wherein the resource indication identifies a time-domain offset from a last symbol of the PUSCH that is punctured to a first symbol of the PUCCH resource that the first node will utilize for transmitting the uplink preemption indication.

Any of the above example methods, wherein transmitting the uplink preemption indication from the first node to the parent backhaul node identifying at least the portion of the resource that is punctured by the first node, comprises: transmitting the uplink preemption indication during the first time slot in one or more reserved resource elements located in a last orthogonal frequency-division multiplexing (OFDM) symbol of the PUSCH that is punctured by the first node.

Any of the above example methods, wherein transmitting the uplink preemption indication from the first node to the second node identifying at least the portion of the resource that is punctured by the IAB node, comprises: transmitting the uplink preemption indication corresponding to the uplink traffic transmission of the PUSCH during the first time slot in one or more reserved frequency-division multiplexing (OFDM) symbol of a second PUSCH that is transmitted to the parent backhaul node during a second time period, wherein the second PUSCH transmission is a retransmission or repetition of the first PUSCH that is transmitted from the first node to the second node.

Any of the above example methods, wherein transmitting the uplink preemption indication from the first node to the second node identifying at least the portion of the resource that is punctured by the IAB node, comprises: transmitting the uplink preemption indication corresponding to the uplink traffic transmission of the PUSCH during the first time slot in a media access control address control element (MAC-CE) message by a second PUSCH transmitted to the parent backhaul node during a second time period.

Any of the above example methods, wherein the uplink preemption indication is one of a slot level or a transport block level indication.

Any of the above example methods, wherein the uplink preemption indication is one of a symbol level or a frequency-range level indication.

Any of the above example methods, further comprising: determining, at the first node, whether resources for the uplink preemption indication are needed based at least in part on a determination whether the resources can be used by the third node for uplink transmission of the urgent URLLC traffic; and transmitting a scheduling request from the first node to the second node to indicate whether the resources for the uplink preemption indication are allocated based on the determining.

Any of the above example methods, wherein the first node is an integrated access and backhaul (IAB) node, wherein the second node is a parent backhaul node, and wherein the third node is at least one of a child IAB node or a user equipment (UE).

In another example, aspects of the present disclosure include an apparatus for wireless communications, comprising: a memory configured to store instructions; a processor communicatively coupled with the memory, the processor configured to execute the instructions to: transmit an uplink traffic from the first node to a second node during a first time slot over a physical uplink shared channel (PUSCH); receive, at the first node, an urgent ultra-reliable low-latency communication (URLLC) traffic from a third node during the first time slot on resources that collide with the uplink traffic transmission from the first node to the parent backhaul node; puncture at least a portion of a resource of the PUSCH for the uplink traffic from the first node to the second node during the first time slot based on reception of the urgent URLLC traffic at the first node; and transmit an uplink preemption indication from the first node to the second node identifying at least the portion of the resource that is punctured by the first node.

An above example apparatus, wherein the processor is further configured to execute the instructions to: transmit a downlink control information (DCI) from the first node to the second node to schedule resources for transmission of the uplink traffic during a first time slot over the PUSCH, wherein the DCI further includes a resource indication of a physical uplink control channel (PUCCH) resources that the IAB node will use to transmit the uplink preemption indication during a second time period.

Any of the above example apparatus, wherein the resource indication includes identification of both of a PUCCH resource set identification (ID) and the PUCCH resource ID within the PUCCH resource set ID.

Any of the above example apparatus, wherein the resource indication includes identification of a PUCCH resource identification (ID) within a PUCCH resource set ID, wherein the PUCCH resource set ID is omitted from the resource indication and is predetermined between the IAB node and the parent backhaul node.

Any of the above example apparatus, wherein the resource indication identifies a time-domain offset from a last symbol of the PUSCH that is punctured to a first symbol of the PUCCH resource that the IAB node will utilize for transmitting the uplink preemption indication.

Any of the above example apparatus, wherein the instructions to transmit the uplink preemption indication from the IAB node to the parent backhaul node identifying at least the portion of the resource that is punctured by the IAB node, are further executable by the processor: transmit the uplink preemption indication during the first time slot in one or more reserved resource elements located in a last orthogonal frequency-division multiplexing (OFDM) symbol of the PUSCH that is punctured by the IAB node.

Any of the above example apparatus, wherein the instructions to transmit the uplink preemption indication from the IAB node to the parent backhaul node identifying at least the portion of the resource that is punctured by the IAB node, are further executable by the processor: transmit the uplink preemption indication corresponding to the uplink traffic transmission of the PUSCH during the first time slot in one or more reserved resource elements located in a last orthogonal frequency-division multiplexing (OFDM) symbol of a second PUSCH that is transmitted to the parent backhaul node during a second time period, wherein the second PUSCH transmission is a retransmission or repetition of the first PUSCH that is transmitted from the IAB node to the parent backhaul node.

Any of the above example apparatus, wherein the instructions to transmit the uplink preemption indication from the IAB node to the parent backhaul node identifying at least the portion of the resource that is punctured by the IAB node, are further executable by the processor: transmit the uplink preemption indication corresponding to the uplink traffic transmission of the PUSCH during the first time slot in a media access control address control element (MAC-CE) message by a second PUSCH transmitted to the parent backhaul node during a second time period.

Any of the above example apparatus, wherein the uplink preemption indication is one of a slot level or a transport block level indication.

Any of the above example apparatus, wherein the uplink preemption indication is one of a symbol level or a frequency-range level indication.

In another example, aspect of the present disclosure include a non-transitory computer readable medium storing instructions, executable by a processor, for wireless communications, comprising instructions for: transmitting an uplink traffic from the first node to a second node during a first time slot over a physical uplink shared channel (PUSCH); receiving, at the first node, an urgent ultra-reliable low-latency communication (URLLC) traffic from a third node during the first time slot on resources that collide with the uplink traffic transmission from the first node to the parent backhaul node; puncturing at least a portion of a resource of the PUSCH for the uplink traffic from the first node to the second node during the first time slot based on reception of the urgent URLLC traffic at the first node; and transmitting an uplink preemption indication from the first node to the parent backhaul node identifying at least the portion of the resource that is punctured by the first node.

An above example non-transitory computer readable medium, further comprising instructions for: transmitting a downlink control information (DCI) from the IAB node to the parent backhaul node to schedule resources for transmission of the uplink traffic during a first time slot over the PUSCH, wherein the DCI further includes a resource indication of a physical uplink control channel (PUCCH) resources that the IAB node will use to transmit the uplink preemption indication during a second time period.

Any of the above example non-transitory computer readable medium, wherein the resource indication includes identification of both of a PUCCH resource set identification (ID) and the PUCCH resource ID within the PUCCH resource set ID.

Any of the above example non-transitory computer readable medium, wherein the resource indication includes identification of a PUCCH resource identification (ID) within a PUCCH resource set ID, wherein the PUCCH resource set ID is omitted from the resource indication and is predetermined between the IAB node and the parent backhaul node.

Any of the above example non-transitory computer readable medium, wherein the resource indication identifies a time-domain offset from a last symbol of the PUSCH that is punctured to a first symbol of the PUCCH resource that the IAB node will utilize for transmitting the uplink preemption indication.

Any of the above example non-transitory computer readable medium, wherein the instructions for transmitting the uplink preemption indication from the IAB node to the parent backhaul node identifying at least the portion of the resource that is punctured by the IAB node, further include instructions for: transmitting the uplink preemption indication during the first time slot in one or more reserved resource elements located in a last orthogonal frequency-division multiplexing (OFDM) symbol of the PUSCH that is punctured by the IAB node.

Any of the above example non-transitory computer readable medium, wherein the instructions for transmitting the uplink preemption indication from the IAB node to the parent backhaul node identifying at least the portion of the resource that is punctured by the IAB node, further include instructions for: transmitting the uplink preemption indication corresponding to the uplink traffic transmission of the PUSCH during the first time slot in one or more reserved resource elements located in a last orthogonal frequency-division multiplexing (OFDM) symbol of a second PUSCH that is transmitted to the parent backhaul node during a second time period, wherein the second PUSCH transmission is a retransmission or repetition of the first PUSCH that is transmitted from the IAB node to the parent backhaul node.

Any of the above example non-transitory computer readable medium, wherein the instructions for transmitting the uplink preemption indication from the IAB node to the parent backhaul node identifying at least the portion of the resource that is punctured by the IAB node, further include instructions for: transmitting the uplink preemption indication corresponding to the uplink traffic transmission of the PUSCH during the first time slot in a media access control address control element (MAC-CE) message by a second PUSCH transmitted to the parent backhaul node during a second time period.

Any of the above example non-transitory computer readable medium, wherein the uplink preemption indication is one of a slot level or a transport block level indication.

Any of the above example non-transitory computer readable medium, wherein the uplink preemption indication is one of a symbol level or a frequency-range level indication.

In another example, aspect of the present disclosure may include an apparatus for wireless communications, comprising: means for transmitting an uplink traffic from the IAB node to a parent backhaul node during a first time slot over a physical uplink shared channel (PUSCH); means for receiving, at the IAB node, an urgent ultra-reliable low-latency communication (URLLC) traffic from at least one of a child IAB node or a user equipment (UE) during the first time slot on resources that collide with the uplink traffic transmission from the IAB node to the parent backhaul node; means for puncturing at least a portion of a resource of the PUSCH for the uplink traffic from the IAB to the parent backhaul node during the first time slot based on reception of the urgent URLLC traffic at the IAB node; and means for transmitting an uplink preemption indication from the IAB node to the parent backhaul node identifying at least the portion of the resource that is punctured by the IAB node.

An above example apparatus, further comprising: means for transmitting a downlink control information (DCI) from the IAB node to the parent backhaul node to schedule resources for transmission of the uplink traffic during a first time slot over the PUSCH, wherein the DCI further includes a resource indication of a physical uplink control channel (PUCCH) resources that the IAB node will use to transmit the uplink preemption indication during a second time period.

Any of the above example apparatus, wherein the resource indication includes identification of both of a PUCCH resource set identification (ID) and the PUCCH resource ID within the PUCCH resource set ID.

Any of the above example apparatus, wherein the resource indication includes identification of a PUCCH resource identification (ID) within a PUCCH resource set ID, wherein the PUCCH resource set ID is omitted from the resource indication and is predetermined between the IAB node and the parent backhaul node.

Any of the above example apparatus, wherein the resource indication identifies a time-domain offset from a last symbol of the PUSCH that is punctured to a first symbol of the PUCCH resource that the IAB node will utilize for transmitting the uplink preemption indication.

Any of the above example apparatus, wherein the means for transmitting the uplink preemption indication from the IAB node to the parent backhaul node identifying at least the portion of the resource that is punctured by the IAB node, further comprise: means for transmitting the uplink preemption indication during the first time slot in one or more reserved resource elements located in a last orthogonal frequency-division multiplexing (OFDM) symbol of the PUSCH that is punctured by the IAB node.

Any of the above example apparatus, wherein the means for transmitting the uplink preemption indication from the IAB node to the parent backhaul node identifying at least the portion of the resource that is punctured by the IAB node, further comprise: means for transmitting the uplink preemption indication corresponding to the uplink traffic transmission of the PUSCH during the first time slot in one or more reserved resource elements located in a last orthogonal frequency-division multiplexing (OFDM) symbol of a second PUSCH that is transmitted to the parent backhaul node during a second time period, wherein the second PUSCH transmission is a retransmission or repetition of the first PUSCH that is transmitted from the IAB node to the parent backhaul node.

Any of the above example apparatus, wherein the means for transmitting the uplink preemption indication from the IAB node to the parent backhaul node identifying at least the portion of the resource that is punctured by the IAB node, further comprise: means for transmitting the uplink preemption indication corresponding to the uplink traffic transmission of the PUSCH during the first time slot in a media access control address control element (MAC-CE) message by a second PUSCH transmitted to the parent backhaul node during a second time period.

Any of the above example apparatus, wherein the uplink preemption indication is one of a slot level or a transport block level indication.

Any of the above example apparatus, wherein the uplink preemption indication is one of a symbol level or a frequency-range level indication.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications implemented by an integrated access and backhaul (IAB) node, comprising:
    transmitting an uplink traffic to a second node during a first time slot over a physical uplink shared channel (PUSCH);
    receiving an urgent ultra-reliable low-latency communication (URLLC) traffic from a third node during the first time slot on resources that collide with the uplink traffic transmission from the IAB node to the second node;
puncturing at least a portion of a resource of the PUSCH for the uplink traffic from the IAB node to the second node during the first time slot based on reception of the urgent URLLC traffic at the IAB node, wherein puncturing at least the portion of the resource of the PUSCH corresponds to removing one or more parity bits of the resource of the PUSCH after encoding with an error-correction code; and
transmitting an uplink preemption indication to the second node identifying at least the portion of the resource that is punctured by the IAB node.

2. The method of claim 1, further comprising:
transmitting a downlink control information (DCI) to the second node to schedule resources for transmission of the uplink traffic during the first time slot over the PUSCH,
wherein the DCI further includes a resource indication of a physical uplink control channel (PUCCH) resources that the IAB node will use to transmit the uplink preemption indication during a second time period.

3. The method of claim 2, wherein the resource indication includes identification of both of a PUCCH resource set identification (ID) and the PUCCH resource ID within the PUCCH resource set ID.

4. The method of claim 2, wherein the resource indication includes identification of a PUCCH resource identification (ID) within a PUCCH resource set ID,
wherein the PUCCH resource set ID is omitted from the resource indication and is predetermined between the IAB node and the second node.

5. The method of claim 2, wherein the resource indication identifies a time-domain offset from a last symbol of the PUSCH that is punctured to a first symbol of the PUCCH resource that the IAB node will utilize for transmitting the uplink preemption indication.

6. The method of claim 1, wherein transmitting the uplink preemption indication to the second node identifying at least the portion of the resource that is punctured by the IAB node, comprises:
transmitting the uplink preemption indication during the first time slot in one or more reserved resource elements located in a last orthogonal frequency-division multiplexing (OFDM) symbol of the PUSCH that is punctured by the IAB node,
wherein the PUSCH is rate-matched based on the one or more reserved resource elements.

7. The method of claim 6, wherein transmitting the uplink preemption indication during the first time slot in one or more reserved resource elements located in a last OFDM symbol of the PUSCH that is punctured by the IAB node further comprising,
the signals comprised by the reserved resource elements are encoded based at least in part on selecting from a plurality of encoding sequences that each indicates a different puncturing technique.

8. The method of claim 1, wherein transmitting the uplink preemption indication to the second node identifying at least the portion of the resource that is punctured by the IAB node, comprises:
transmitting the uplink preemption indication corresponding to the uplink traffic transmission of the PUSCH during the first time slot in one or more reserved resource elements located in a last orthogonal frequency-division multiplexing (OFDM) symbol of a second PUSCH that is transmitted to the second node during a second time period,
wherein the second PUSCH transmission is a retransmission or repetition of the first PUSCH that is transmitted from the IAB node to the second node, and
wherein the PUSCH is rate-matched around the one or more reserved resource elements.

9. The method of claim 8, wherein transmitting the uplink preemption indication corresponding to the uplink traffic transmission of the PUSCH during the first time slot in one or more reserved resource elements located in a last OFDM symbol of a second PUSCH that is transmitted to the second node during a second time period, further comprising,
the signals comprised by the reserved resource elements are encoded based at least in part on selecting from a plurality of encoding sequences that each indicates a different puncturing technique.

10. The method of claim 1, wherein transmitting the uplink preemption indication to the second node identifying at least the portion of the resource that is punctured by the IAB node, comprises:
transmitting the uplink preemption indication corresponding to the uplink traffic transmission of the PUSCH during the first time slot in a media access control address control element (MAC-CE) message by a second PUSCH transmitted to the second node during a second time period.

11. The method of claim 1, wherein transmitting the uplink preemption indication to the second node identifying at least the portion of the resource that is punctured by the IAB node, comprises:
transmitting the uplink preemption indication via a demodulation reference signal (DMRS) that is transmitted to the second node, wherein the DMRS is selected from a plurality of DMRS sequences that each indicates a different puncturing technique.

12. The method of claim 11, further comprising:
transmitting configurations associated with the plurality of DMRS sequences is transmitted in a scheduling request from one of the IAB node to the second node, or the second node to the IAB node.

13. The method of claim 1, wherein the uplink preemption indication is one of a slot level, a transport block level indication, symbol level, or a frequency-range level indication.

14. The method of claim 1, further comprising:
determining, at the IAB node, whether resources for the uplink preemption indication are needed based at least in part on a determination whether the resources can be used by the third node for uplink transmission of the urgent URLLC traffic; and
transmitting a scheduling request to the second node to indicate whether the resources for the uplink preemption indication are allocated based on the determining.

15. The method of claim 1, further comprising:
transmitting a scheduling request to the second node to indicate a puncturing technique that was applied by the IAB node from a plurality of puncturing techniques available.

16. The method of claim 1, wherein the IAB node is an integrated access and backhaul (IAB) node,
wherein the second node is a parent backhaul node, and
wherein the third node is at least one of a child IAB node or a user equipment (UE).

17. An apparatus for an integrated access and backhaul (IAB) node for wireless communications, comprising:
a memory configured to store instructions; and a processor communicatively coupled with the memory, the processor configured to execute the instructions to:

transmit an uplink traffic from the IAB node to a second node during a first time slot over a physical uplink shared channel (PUSCH);

receive an urgent ultra-reliable low-latency communication (URLLC) traffic from a third node during the first time slot on resources that collide with the uplink traffic transmission to the second node;

puncture at least a portion of a resource of the PUSCH for the uplink traffic from the IAD node to the second node during the first time slot based on reception of the urgent URLLC traffic at the IAB node, wherein the processor configured to puncture at least the portion of the resource of the PUSCH is further configured to remove one or more parity bits of the resource of the PUSCH after encoding with an error-correction code; and transmit an uplink preemption indication from the IAB node to the second node identifying at least the portion of the resource that is punctured by the IAB node.

18. A non-transitory computer readable medium storing instructions, executable by a processor of an integrated access and backhaul (IAB) node, for wireless communications, comprising instructions for:

transmitting an uplink traffic from the IAB node to a second node during a first time slot over a physical uplink shared channel (PUSCH);

receiving, at the IAB node, an urgent ultra-reliable low-latency communication (URLLC) traffic from a third node during the first time slot on resources that collide with the uplink traffic transmission from the IAB node to the second node;

puncturing at least a portion of a resource of the PUSCH for the uplink traffic from the IAB node to the second node during the first time slot based on reception of the urgent URLLC traffic at the IAB node, wherein puncturing at least the portion of the resource of the PUSCH corresponds to removing one or more parity bits of the resource of the PUSCH after encoding with an error-correction code; and transmitting an uplink preemption indication from the IAB node to the second node identifying at least the portion of the resource that is punctured by the IAB node.

19. An apparatus for wireless communications, comprising:

means for transmitting an uplink traffic from an integrated access and backhaul (IAB) node to a second node during a first time slot over a physical uplink shared channel (PUSCH);

means for receiving, at the IAB node, an urgent ultra-reliable low-latency communication (URLLC) traffic from a third during the first time slot on resources that collide with the uplink traffic transmission from the IAB node to the second node;

means for puncturing at least a portion of a resource of the PUSCH for the uplink traffic from the IAB node to the second node during the first time slot based on reception of the urgent URLLC traffic at the IAB node, wherein the means for puncturing at least the portion of the resource of the PUSCH corresponds to means for removing one or more parity bits of the resource of the PUSCH after encoding with an error-correction code; and means for transmitting an uplink preemption indication from the IAB node to the second node identifying at least the portion of the resource that is punctured by the IAB node.

20. A method for wireless communications implemented by an integrated access and backhaul (IAB) node, comprising:

receiving an uplink traffic from a first node during a first time slot over a physical uplink shared channel (PUSCH);

receiving an uplink preemption indication from the first node identifying that at least a portion of a resource of the PUSCH for the uplink traffic from the first node to the IAB node was punctured by the first node due to an urgent ultra-reliable low-latency communication (URLLC) traffic being received at the first node during the first time slot over at least the portion of the resources that collide with the uplink traffic transmission from the first node to the IAB node, wherein the portion of the resource of the PUSCH for the uplink traffic from the first node to the IAB node being punctured corresponds to removing one or more parity bits of the resource of the PUSCH after encoding with an error-correction code; and decoding the uplink preemption indication in order to identify at least the portion of the resource corresponding to a punctured traffic.

21. The method of claim 20, further comprising:

receiving a downlink control information (DCI) from the first node at the IAB node to schedule resources for transmission of the uplink traffic during the first time slot over the PUSCH, wherein the DCI further includes a resource indication of a physical uplink control channel (PUCCH) resources that the first node will use to transmit the uplink preemption indication during a second time period.

22. The method of claim 21, wherein the resource indication includes identification of both of a PUCCH resource set identification (ID) and the PUCCH resource ID within the PUCCH resource set ID.

23. The method of claim 21, wherein the resource indication includes identification of a PUCCH resource identification (ID) within a PUCCH resource set ID, wherein the PUCCH resource set ID is omitted from the resource indication and is predetermined between the first node and the IAB node.

24. The method of claim 21, wherein the resource indication identifies a time-domain offset from a last symbol of the PUSCH that is punctured to a first symbol of the PUCCH resource that the first node will utilize for transmitting the uplink preemption indication.

25. The method of claim 20, wherein receiving the uplink preemption indication from the first node at the IAB node identifying at least the portion of the resource that is punctured by the first node, comprises:

receiving the uplink preemption indication during the first time slot in one or more reserved resource elements located in a last orthogonal frequency-division multiplexing (OFDM) symbol of the PUSCH that is punctured by the first node, wherein the PUSCH is rate-matched around on the one or more reserved resource elements.

26. The method of claim 25, wherein the one or more reserved resource elements used for transmission of the uplink preemption indication are selected from a plurality of resource element sequences that each indicate a different puncturing technique.

27. The method of claim 20, wherein receiving the uplink preemption indication from the first node to the IAB node identifying at least the portion of the resource that is punctured by the first node, comprises:
  receiving the uplink preemption indication corresponding to the uplink traffic transmission of the PUSCH during the first time slot in one or more reserved resource elements located in a last orthogonal frequency-division multiplexing (OFDM) symbol of a second PUSCH that is transmitted to the IAB node during a second time period,
  wherein the second PUSCH transmission is a retransmission or repetition of the first PUSCH that is transmitted from the first node to the IAB node, and
  wherein the PUSCH is rate-matched around the one or more reserved resource elements.

28. The method of claim 27, wherein the one or more reserved resource elements used for transmission of the uplink preemption indication are selected from a plurality of resource element sequences that each indicate a different puncturing technique.

29. The method of claim 20, wherein receiving the uplink preemption indication from the first node to the IAB node identifying at least the portion of the resource that is punctured by the first node, comprises:
  receiving the uplink preemption indication via a demodulation reference signal (DMRS) that is transmitted to the IAB node, wherein the DMRS is selected from a plurality of DMRS sequences that identify at least the portion of the resource that is punctured by the first node.

30. The method of claim 29, further comprising:
  receiving configurations associated with the plurality of DMRS sequences is transmitted in a scheduling request from one of the first node to the IAB node, or the IAB node to the first node.

31. The method of claim 20, wherein receiving the uplink preemption indication from the first node to the IAB node identifying at least the portion of the resource that is punctured by the first node, comprises:
  receiving the uplink preemption indication corresponding to the uplink traffic transmission of the PUSCH during the first time slot in a media access control address control element (MAC CE) message by a second PUSCH transmitted to the IAB node during a second time period.

32. The method of claim 20, wherein the uplink preemption indication is one of a slot level, a transport block level indication, symbol level, or a frequency range level indication.

33. The method of claim 20, wherein the first node is an integrated access and backhaul (IAB) node,
  wherein the IAB node is a parent backhaul node, and
  wherein the third node is at least one of a child IAB node or a user equipment (UE).

34. An apparatus for an integrated access and backhaul (IAB) node for wireless communications, comprising:
  a memory configured to store instructions; and
  a processor communicatively coupled with the memory, the processor configured to execute the instructions to:
  receive an uplink traffic from a first node during a first time slot over a physical uplink shared channel (PUSCH);
  receive an uplink preemption indication at the IAB node from the first node identifying that at least a portion of a resource of the PUSCH for the uplink traffic from the first node to the IAB node was punctured by the first node due to an urgent ultra-reliable low-latency communication (URLLC) traffic being received at the first node during the first time slot over at least the portion of the resources that collide with the uplink traffic transmission from the first node to the IAB node, wherein the portion of the resource of the PUSCH for the uplink traffic from the first node to the IAB node being punctured corresponds to the processor being configured to remove one or more parity bits of the resource of the PUSCH after encoding with an error-correction code; and
  decode the uplink preemption indication in order to identify at least the portion of the resource corresponding to a punctured traffic.

* * * * *